United States Patent
Cullen

(10) Patent No.: US 7,437,861 B2
(45) Date of Patent: *Oct. 21, 2008

(54) BAGGING MACHINE WITH A TUNNEL AT LEAST PARTIALLY FORMED OF FLEXIBLE MATERIAL

(75) Inventor: Steven R. Cullen, Astoria, OR (US)

(73) Assignee: SRC Innovations, LLC, Astoria, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/020,646

(22) Filed: Dec. 22, 2004

(65) Prior Publication Data

US 2005/0155332 A1 Jul. 21, 2005

Related U.S. Application Data

(63) Continuation-in-part of application No. 10/350,680, filed on Jan. 23, 2003, now Pat. No. 6,834,479, and a continuation-in-part of application No. 10/264,161, filed on Oct. 3, 2002, now Pat. No. 6,907,714.

(51) Int. Cl.
  *B65B 13/20* (2006.01)
  *B65B 63/02* (2006.01)
(52) U.S. Cl. .............................. 53/530; 53/576; 53/438
(58) Field of Classification Search ................... 53/527, 53/530, 529, 567, 570, 574, 576, 436, 438
  See application file for complete search history.

(56) References Cited

U.S. PATENT DOCUMENTS

| | | | |
|---|---|---|---|
| 3,290,841 A * | 12/1966 | Sartore | ........................ 53/258 |
| 3,638,394 A | 2/1972 | Winokur | |
| 3,687,061 A | 8/1972 | Eggenmuller et al. | |
| 3,968,619 A | 7/1976 | Fishburne | |
| 4,046,068 A | 9/1977 | Eggenmuller et al. | |
| 4,518,046 A | 5/1985 | Rettig et al. | |
| 4,661,989 A * | 4/1987 | Risby | ............................. 383/2 |
| 4,888,937 A * | 12/1989 | Glenn | ........................ 53/567 |
| 4,945,715 A * | 8/1990 | Brodrecht | ..................... 53/567 |
| 5,113,956 A | 5/1992 | Friesen et al. | |
| 5,140,802 A | 8/1992 | Inman et al. | |
| 5,191,758 A | 3/1993 | Cote | |
| 5,205,107 A | 4/1993 | Herink | |
| 5,295,554 A | 3/1994 | Cullen | |
| 5,297,377 A | 3/1994 | Cullen | |
| 5,313,768 A | 5/1994 | Cullen | |
| 5,316,060 A | 5/1994 | Hodgdon et al. | |
| 5,345,744 A | 9/1994 | Cullen | |
| 5,355,659 A | 10/1994 | Cullen | |
| 5,367,860 A | 11/1994 | Cullen | |
| 5,396,753 A | 3/1995 | Cullen | |

(Continued)

*Primary Examiner*—Rinaldi I. Rada
*Assistant Examiner*—Paul Durand
(74) *Attorney, Agent, or Firm*—Snell & Wilmer, L.L.P.

(57) ABSTRACT

A bagging machine for packing agricultural or compost material into bags includes a tunnel defined at least partially by flexible material. The tunnel may include perimeter members and support members spanned by a flexible material. Alternatively, the tunnel may include a flexible sleeve and a shaping assembly adapted to define the shape of the tunnel passageway. The tunnel may be configurable in a variety of cross-sections to enable the tunnel to be used with different sizes of bags. Additionally, the tunnels may be collapsible for convenient storage and transportation.

26 Claims, 15 Drawing Sheets

U.S. PATENT DOCUMENTS

| | | | |
|---|---|---|---|
| 5,398,736 A | 3/1995 | Cullen | |
| 5,408,809 A | 4/1995 | Cullen | |
| 5,408,810 A | 4/1995 | Cullen | |
| 5,419,102 A * | 5/1995 | Inman et al. | 53/567 |
| 5,421,142 A | 6/1995 | Cullen | |
| 5,425,220 A | 6/1995 | Cullen | |
| 5,426,910 A | 6/1995 | Cullen | |
| 5,452,562 A | 9/1995 | Cullen | |
| 5,463,849 A | 11/1995 | Cullen | |
| 5,464,049 A | 11/1995 | Cullen | |
| 5,469,693 A * | 11/1995 | Brodrecht | 53/567 |
| 5,488,996 A | 2/1996 | Barry et al. | |
| 5,517,806 A | 5/1996 | Cullen | |
| 5,566,532 A * | 10/1996 | Inman et al. | 53/529 |
| 5,671,594 A | 9/1997 | Cullen | |
| 5,724,793 A | 3/1998 | Inman et al. | |
| 5,775,069 A | 7/1998 | Cullen | |
| 5,784,865 A | 7/1998 | Cullen | |
| 5,799,472 A | 9/1998 | Cullen | |
| 5,857,313 A | 1/1999 | Cullen | |
| 5,894,713 A | 4/1999 | Cullen | |
| 5,899,247 A | 5/1999 | Cullen | |
| 5,904,031 A | 5/1999 | Cullen | |
| 5,960,612 A | 10/1999 | Cullen | |
| 6,009,692 A | 1/2000 | Cullen | |
| 6,050,066 A * | 4/2000 | Brodrecht | 53/576 |
| 6,220,001 B1 * | 4/2001 | Brodrecht | 53/567 |
| 6,550,967 B2 | 4/2003 | Hedaya | |
| 6,591,588 B2 * | 7/2003 | Inman et al. | 53/576 |
| 6,708,742 B2 | 3/2004 | Weathers et al. | |

* cited by examiner

BAGGING MACHINE WITH A TUNNEL AT LEAST PARTIALLY FORMED OF FLEXIBLE MATERIAL

CROSS-REFERENCES TO RELATED APPLICATIONS

This is a continuation-in-part application of U.S. patent application Ser. No. 10/264,161, filed on Oct. 3, 2002 now U.S. Pat. No. 6,907,714, entitled "Bagging Machine Having A Collapsible Tunnel," and of U.S. patent application Ser. No. 10/350,680, filed on Jan. 23, 2003 now U.S. Pat. No. 6,834,479, bearing the same title. The entire disclosure of these two applications is incorporated herein by reference for all purposes.

FIELD OF THE INVENTION

This invention relates to a bagging machine for bagging organic and other materials such as silage, compost, grain, sawdust, dirt, sand, etc., in which the tunnel of the bagging machine is adjustable.

BACKGROUND OF THE INVENTION

Agricultural feed bagging machines have been employed for several years to pack or bag silage or the like into elongated plastic bags. In recent years, the bagging machines have also been used to pack or bag compost material and grain into the elongated plastic bags. Two of the earliest bagging machines are disclosed in U.S. Pat. Nos. 3,687,061 and 4,046,068, the complete disclosures of which are incorporated herein by reference for all purposes. In these bagging machines, silage or the like is supplied to the forward or intake end of the bagging machine and is fed to a rotor or other compression means, which conveys the silage into a tunnel on which the bag is positioned so that the bag is filled. The bagging machine moves forward at a controlled rate leaving the packed bag behind. The packing density of the material packed in the bag is determined and controlled by a number of factors including the rate at which the bagging machine moves forward and the rate at which the silage material is packed into the bag.

Over the past several years, bagging machines and their associated tunnels have dramatically increased in size to accommodate end-users' desire to use larger bags. Tunnels for use with the bagging machines are available in a variety of widths, some of which are sufficiently large to accommodate bags having a 12-foot diameter. The large width of the tunnel presents a problem when the bagging machine is being transported on public roads, which normally limit those widths to approximately 102 inches (8.5 feet). Such width restrictions greatly reduce the mobility of machines with larger tunnels. The large width of the tunnel also presents a problem when the machines and tunnels are being shipped, especially overseas.

Another drawback with many conventional bagging machines is that they can only be used with bags of a single width. That is, conventional bagging machines can be used with bags of varying length, sometimes up to several hundred feet long. However, a bagging machine and associated tunnel typically can only be used with bags of a single width, such as 8 feet, 10 feet, 12 feet, or a predetermined width therebetween. Bagging machines, whether used to bag feed, compost, or other material, can be used in a variety of circumstances and to serve multiple end-users. A particular farm may need to bag different types of silage in different size bags. The same farmer may also want to compost material in yet another size bag. Using conventional bagging technology, a separate machine, or at least separate tunnels, would be required for each such use, the cost of which would be prohibitive.

SUMMARY OF THE INVENTION

A tunnel for use with a bagging machine is disclosed in the present application. The tunnel includes a first tunnel member having forward and rearward ends and a second tunnel member having forward and rearward ends. The forward ends of the first and second tunnel members may be operatively coupled in a fixed, spaced-apart relationship. The rearward ends of the first and second tunnel members may be selectively movable toward one another and away from one another.

The first and second tunnel members may have upper and lower ends. The upper ends of the first and second tunnel members may be operatively coupled to be selectively movable towards one another and away from one another. A third tunnel member may extend at least between the upper ends of the first and second tunnel members. The third tunnel member may be adapted to span a separation between the upper ends of the first and second tunnel members when the upper ends are moved away from one another.

The tunnel may be configurable in two or more positions having different diameters. The bagging machine and/or tunnel further may include coupling assemblies and/or actuating assemblies to assist in moving the tunnel members between the two or more positions and to assist in holding the tunnel members in the user-selected position.

DETAILED DESCRIPTION OF THE PREFERRED EMBODIMENTS

Figure 1:
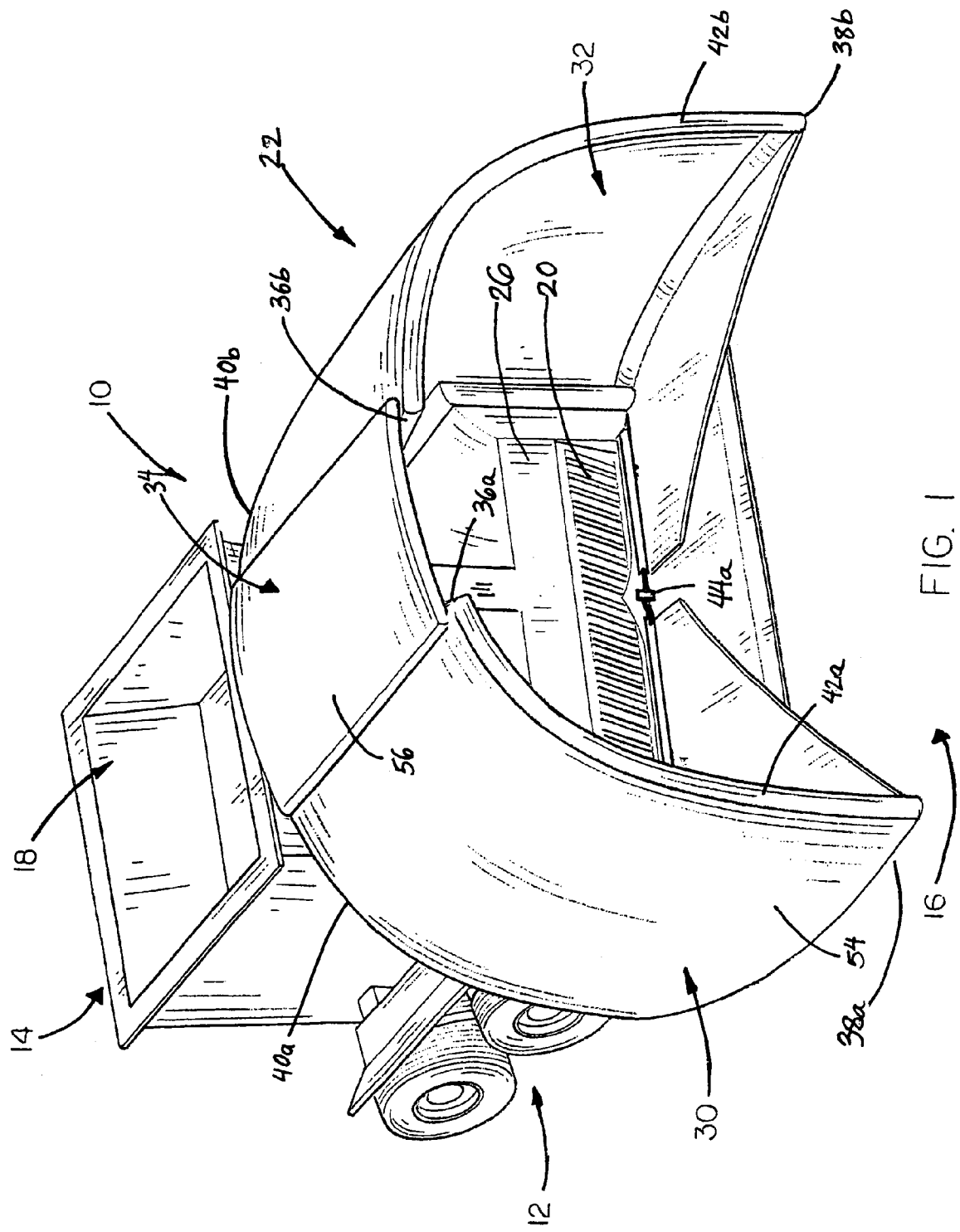
FIG. 1 is a perspective view of a bagging machine having a first and a second tunnel member according to the present disclosure.

In FIG. 1, a bagging machine is identified generally with the numeral 10. Bagging machine 10 is intended to bag organic and other material such as silage, grain, sawdust, compost, garbage, sand, etc. within a bag. Bagging machine 10 may be configured for use with a conventional pre-folded bag, a bag that is folded as it is installed on the bagging machine such as described in U.S. patent application Ser. No. 10/350,973, filed Jan. 23, 2003, entitled "Material Bagging Machine Having a Bag Folder Mounted Thereon," or a bag that is formed from a roll of plastic material disposed on the bagging machine such as described in U.S. patent application Ser. No. 10/334,484, filed Dec. 30, 2002, entitled "A Method and Means for Bagging Organic and Other Material." The entire disclosures of the above-mentioned patent applications are incorporated herein by reference for all purposes. Machine 10 is illustrated as including a mobile frame 12. Mobile frame 12 may include wheels to facilitate movement and control and may also include a hitch to be pulled by a tractor or other equipment. In some embodiments, the wheels and/or hitch may be omitted. Additionally, bagging machine 10 and associated frame 12 may be truck-mounted, such as seen in U.S. Pat. No. 5,784,865, or may be self-propelled, such as illustrated in U.S. Pat. No. 5,799,472. The complete disclosures of both of these patents are incorporated herein by reference for all purposes.

For purposes of description, bagging machine 10 will be described as having a forward end 14 and a rearward end 16. Machine 10 is provided with a material receiving assembly 18 at its forward end which may be in the form of: (1) a feed table such as seen in U.S. Pat. No. 5,297,377; (2) a hopper such as seen in U.S. Pat. No. 5,398,736; (3) a feed mechanism such as shown in U.S. Pat. No. 5,396,753; (4) a feed mechanism such as shown in U.S. Pat. No. 5,367,860; or (5) a hopper such as seen in U.S. Pat. Nos. 5,140,802; 5,419,102; and 5,724,793. The complete disclosures of the above-mentioned patents are incorporated herein by reference for all purposes. Material receiving assembly 18 is configured to receive the material to be bagged and to deliver the same to a material packing assembly 20, which may be positioned at the forward end of a tunnel 22. Material packing assembly 20 may be: (1) a rotor such as shown in U.S. Pat. Nos. 5,396,753; 5,297,377; 5,799, 472; 5,295,554; (2) a screw conveyor such as seen in U.S. Pat. Nos. 5,140,802 or 5,419,102; (3) a plunger as seen in U.S. Pat. No. 5,724,793; or (4) the packing fingers described in U.S. Pat. No. 3,687,061. The complete disclosures of the above-mentioned patents are incorporated herein by reference for all purposes.

While not required, bagging machines 10 of the present disclosure may also include a density control assembly. A density control assembly as used herein refers to structures or devices that are coupled to the bagging machine and used to control or adjust the packing density of the material being packed into the bag. A variety of density control assemblies and methods may be implemented with the bagging machine of the present disclosure some examples of which include backstop control systems, internal control systems, and drag resistance control systems.

In early bagging machines, a backstop structure yieldably engaged the closed end of the agricultural bag to resist the movement of the bagging machine away from the filled end of the agricultural bag as silage is forced into the bag. These machines included a pair of drums rotatably mounted on the bagging machine with a brake associated therewith for braking or resisting the rotation of the drum with a selected brake force. A cable is wrapped around the drum and is connected to the backstop. Examples of such bagging machines are disclosed in U.S. Pat. Nos. 3,687,061 and 4,046,068, previously incorporated by reference.

In more recent bagging machines, an internal density control assembly including one or more cables was positioned in the flow of the agricultural material being bagged. In order to vary the packing density of the material in the machine, more or less cables would be employed based on the material being packed. In other embodiments, a single cable is employed in an arched configuration and the width of the arch is varied to vary the packing density. In still other embodiments, one or more cables are used with an anchor attached to the rearward ends thereof with the anchor being adjustable and/or the length of the cable being adjustable to control the packing density. Examples of these and other alternative configurations are disclosed in U.S. Pat. Nos. 5,297,377; 5,425,220; 5,463,849; 5,464,049; 5,517,806; 5,671,594; 5,775,069; 5,671,594; 5,857,313; 6,443,194; 6,655,116; 6,694,711; and RE38,020, the complete disclosures of which are hereby incorporated by reference for all purposes.

More recently, drag resistance density control assemblies have been developed using belts or straps disposed between the bagged material and the ground. In these embodiments, a drag member, such as one or more belts or straps, is attached to the bagging machine or the tunnel and extends rearwardly behind the tunnel. The drag member is positioned between the bagged material and the ground and may be disposed inside the bag or outside the bag. The weight of the bagged material on the drag member slows the advance of the bagging machine and increases the packing density of the agricultural material in the bag. The packing density of the material in the bag may be established prior to beginning the bagging operation or may be adjusted as the bag is being filled. The packing density is established or adjusted, at least in part, by controlling the amount of drag member surface area disposed under the weight of the bagged material. Density control assemblies for agricultural bagging machines that include drag members are disclosed in U.S. Pat. No. 6,748, 724 and U.S. patent application Ser. No. 10/867,593. The complete disclosures of the above-identified patent and patent application are hereby incorporated by reference for all purposes.

Tunnel 22 may be semi-circular, as shown in FIG. 1, or it may be square, rectangular, circular, oblong, or other such configurations. Tunnel 22 may be open at the bottom, as shown in FIG. 1, or may be closed at the bottom, as will be discussed below. As used herein, the term "tunnel" should be understood to signify a horizontal passageway open at both the forward end thereof and the rearward end thereof. The size of the tunnel, measured by either longitudinal length or cross-sectional area, at any particular time may be dependent on a number of factors including the diameter of the bag being filled, the type of material being bagged, the configuration of the tunnel such as semi-circular or circular, and whether bagging machine 10 is configured to be transported on a highway where machine width is a limiting factor.

A face plate 26 may be operatively secured to the frame of the machine and to the tunnel 22. In some embodiments of the machine, face plate 26 is permanently mounted on the frame with tunnel 22 being removably coupled to the face plate. In other embodiments, face plate 26 is part of tunnel 22 and the face plate is removably coupled to frame 12. In other embodiments, face plate 26 may be omitted and tunnel 22 may be operatively coupled to frame 12, either permanently or removably. Face plate 26 may include an opening 28 through which the material passes from the material packing assembly 20 to the interior of tunnel 22. The location, size, and configuration of face plate 26 and opening 28 may vary depending on the configuration of the frame 12, the material receiving assembly 18, the material packing assembly 20, and the tunnel 22. Throughout this disclosure, reference to tunnel 22 or tunnel members being coupled to frame 12 or bagging machine 10 should be understood to refer to the tunnel or tunnel members being operatively coupled, removably or otherwise, to the faceplate, the frame, or another component of the bagging machine such that during operation of the bagging machine the tunnel is coupled to the frame for forward movement therewith. Various tunnels are shown in U.S. Pat. Nos. 5,899,247; 5,396,753; 5,297,377; 5,799,472; 5,398,736; 5,355,659; 5,295,554; 5,140,802; 5,419,102; 5,421,142; 5,724,793; 5,894,713, the entire disclosures of which are incorporated herein by reference for all purposes.

As depicted in FIG. 1, tunnel 22 includes a first tunnel member 30, a second tunnel member 32, and a third tunnel member 34. First and second tunnel members 30, 32 may be curved as shown to form a semi-circular tunnel but may have other shapes to form tunnels of different configurations, as discussed above. While not necessary, the first and second tunnel members 30, 32 may be symmetrical and may be described as having upper ends 36a, 36b, lower ends 38a, 38b, forward ends 40a, 40b, and rearward ends 42a, 42b.

With reference to FIGS. 1-4, tunnel 22 can be seen to have at least two functional configurations. Tunnel members 30, 32 may be selectively movable between an open position, illustrated in FIG. 3, and a closed position, illustrated in FIG. 4. As shown, forward ends 40a, 40b are hingedly coupled together, such that the movement of the rearward ends 42a, 42b is rotational movement about a single axis of rotation 46. One or more hinges 44a, 44b arranged vertically with a common axis of rotation may couple first and second tunnel members 30, 32. Alternatively, forward ends 40a, 40b may be coupled by two or more hinges having different axes of rotation to couple the forward ends. Whether there are one or two axes of rotation, the forward ends 40 of FIGS. 1-4 are maintained in a fixed, spaced-apart relationship. While the forwards ends are illustrated as being in a fixed, spaced-apart relationship, it will be understood from the description below that forward ends 40a, 40b may be free to move relative to one another.

The first and second tunnel members 30, 32 may be moved between the open and closed positions manually or through use of an actuating assembly. In the open configuration illustrated in FIG. 3, the forward ends 40a, 40b of the tunnel members engage the rearward side of faceplate 26, or the frame 12 when the faceplate is omitted. The pressure of the packed material within the tunnel 22 presses the rearward ends 42a, 42b outwardly, which, in turn, may cause the forward ends 40a, 40b to press against face plate 26 or frame 12 to close the sides of tunnel 22. To configure tunnel 22 in the closed position, the rearward ends 42a, 42b may be manually drawn together and held in place through conventional means, such as straps, latches, or other coupling devices.

Alternatively, the bagging machine illustrated in FIGS. 1-4 may be provided with an actuating assembly. An actuating assembly may be provided to selectively move the rearward ends of the first and second tunnel members toward one another and away from one another. The actuating assembly may include conventional devices for causing movement, such as a hydraulic cylinder, a gear rack, etc. For example, a hydraulic cylinder may be disposed between faceplate 26 and forward ends 40a, 40b to cause the tunnel members to move between the open and closed position.

Bagging machine 10 may also include a coupling assembly to couple the first and second tunnel members in the desired open or closed configuration. The coupling assembly may include telescoping members, straps, cables or other structures configured to hold the tunnel members in the desired open or closed configuration. In some embodiments, the coupling assembly and the actuating assembly may be operatively associated with each other to cause the movement of the first and second tunnel members between the open and closed configurations. One example of operatively associated actuating assemblies and coupling assemblies is a hydraulic cylinder associated with two or more telescoping members.

When tunnel 22 is in the closed position, the width of bagging machine 10 and tunnel 22 is reduced to facilitate or enable transportation over the roadways and to facilitate shipping. The narrower width of tunnel 22 in its closed configuration may also facilitate installation of the bag to be filled.

Figure 3:
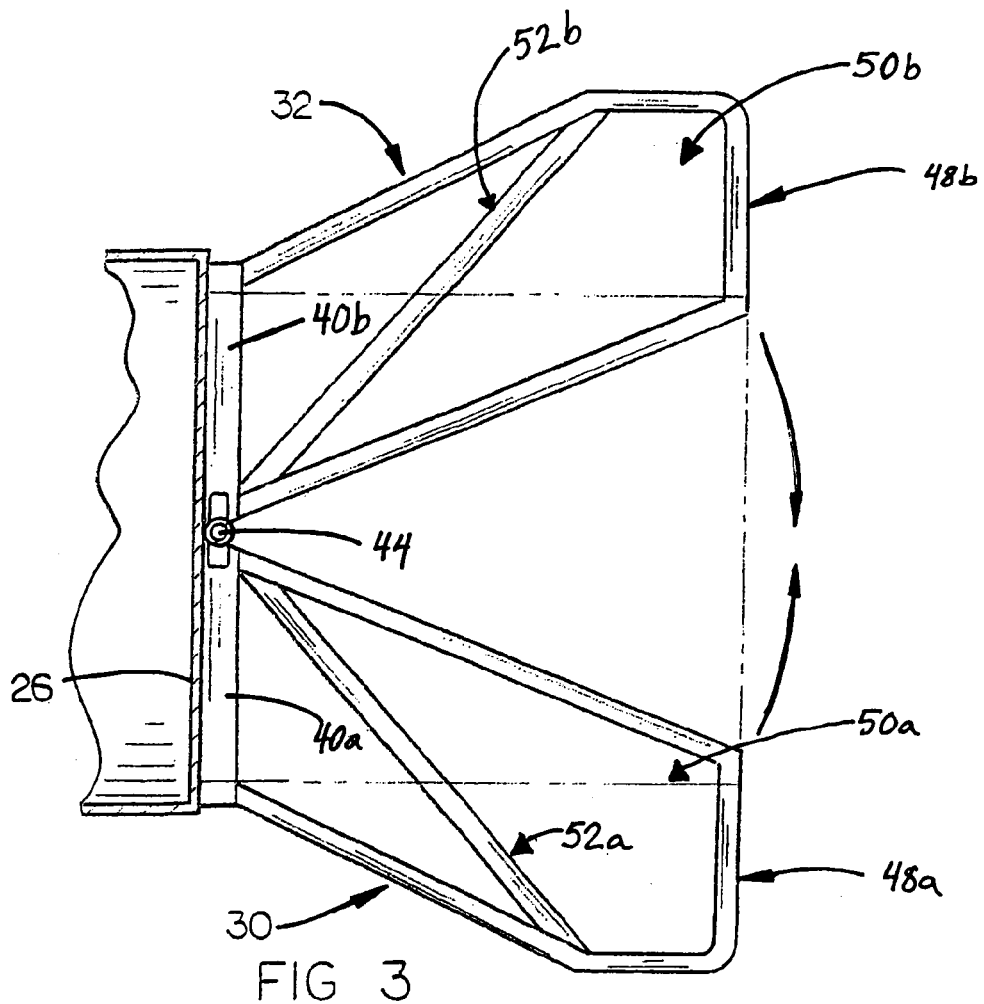
FIG. 3 is a partial top view of the bagging machine shown in FIG. 1 illustrating the tunnel members in a first position.
Figure 4:
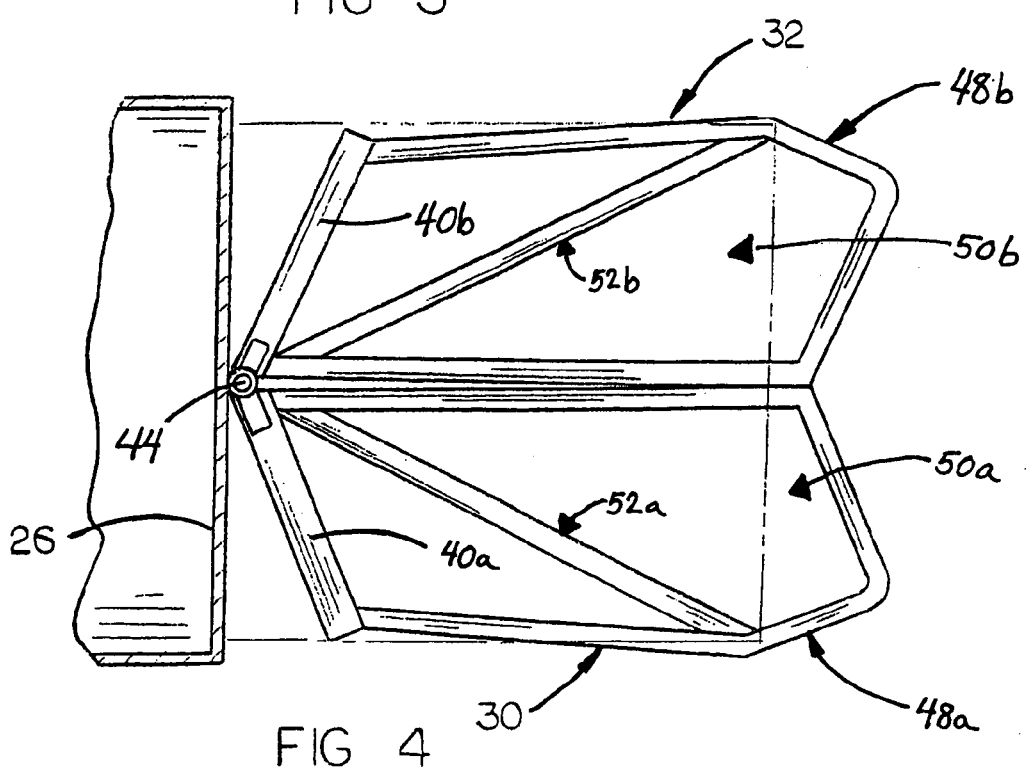
FIG. 4 is a partial top view of the bagging machine shown in FIG. 1 illustrating the tunnel members in a second position.

First and second tunnel members 30, 32 may be formed of a rigid material such as steel or aluminum. In some embodiments, the first and second tunnel members may be manufactured from a single piece of material formed in the desired shape of the tunnel member. In other embodiments, such as shown in FIGS. 3 and 4, the first and second tunnel members may include one or more perimeter members 48 configured to define the perimeter of the first and second tunnel members 30, 32. The one or more perimeter members 48 in each of the first and second tunnel members also define a side panel area 50. Additionally, the first and second tunnel members may include one or more support members 52 in association with the one or more perimeter members 48. Support members 52 may be configured to provide additional strength and integrity to the tunnel member shape defined by the perimeter members. Additionally, support members 52 may be configured to support a shell that may be used to cover the side panel areas 50.

When tunnel 22 includes a shell in cooperation with the perimeter members, the shell may be a single piece of material covering the entire side panel area 50. Alternatively, in embodiments such as shown in FIGS. 3 and 4 where the support member 52 divides the side panel area 50 into two or more areas, the shell may include more than one piece of material, each covering one or more of the smaller areas defined in the side panel area 50.

Figure 5:
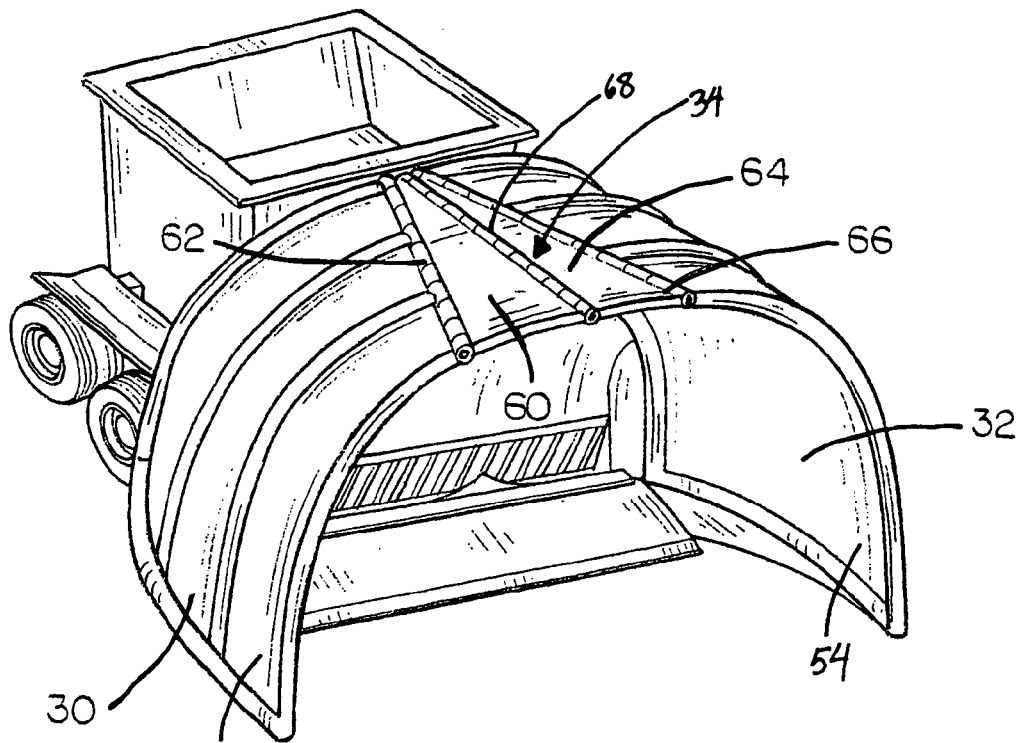
FIG. 5 is a rear perspective view of a tunnel according to the present disclosure showing the tunnel in a first position.
Figure 6:
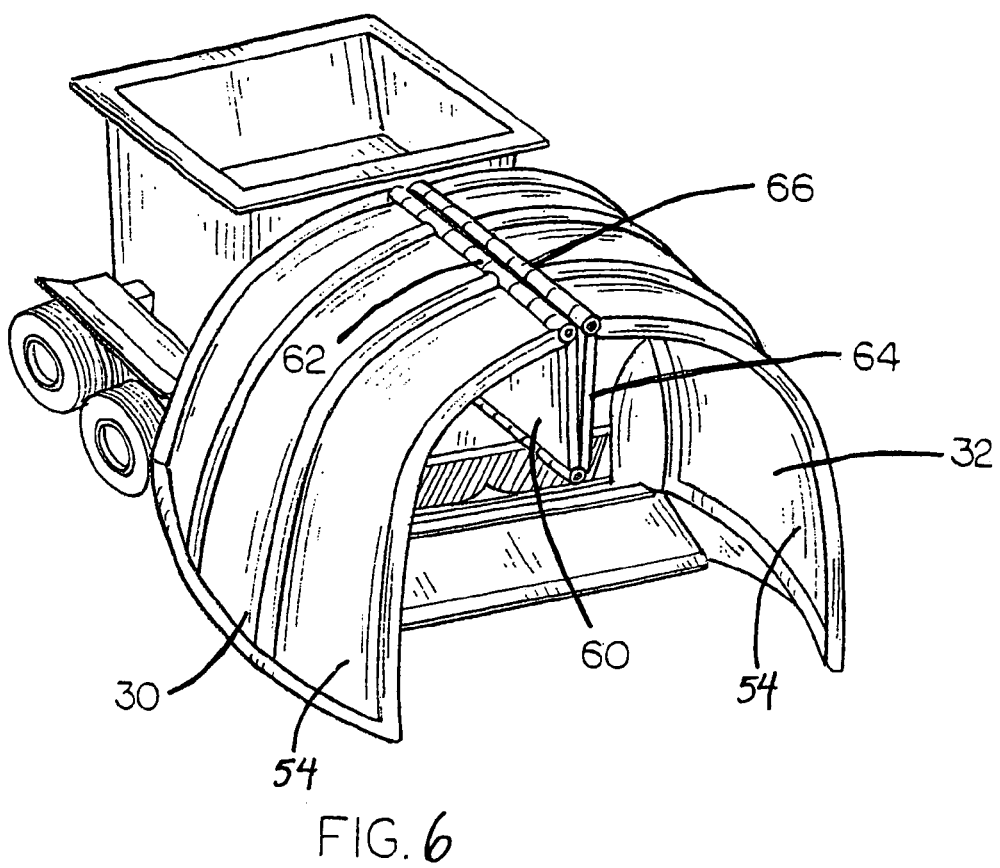
FIG. 6 is a rear perspective view of a tunnel according to the present disclosure showing the tunnel in a second position.

The shell covering the side panel area may be disposed adjacent the interior surfaces of the perimeter and support members of the first and second tunnel members to form a substantially continuous inner surface for the tunnel members, as shown in FIGS. 5 and 6 at numeral 54. Alternatively or additionally, a shell may be disposed adjacent the exterior surfaces of the perimeter and support members to form a substantially continuous outer surface for the tunnel members, as shown in FIG. 1 at numeral 54.

The shells covering the side panel areas 50 of the first and second tunnel members 30, 32 may include rigid materials such as metals, plastics, and composite materials. Alternatively or additionally, the shells may include lightweight, flexible materials such as high-strength fabrics, reinforced fabrics, plastics, and the like. A high-strength fabric or other flexible material, whether used in shells of the first and second tunnel members or used in the third tunnel member, should be understood to refer to materials that are flexible but yet strong enough to not be stretched or torn under the pressures that are typically applied to the tunnel members during a bagging operation. The configuration of the perimeter members and support members and the shell material may be selected such that the deformation of tunnel 22 is minimized during operation of the bagging machine.

Figure 2:
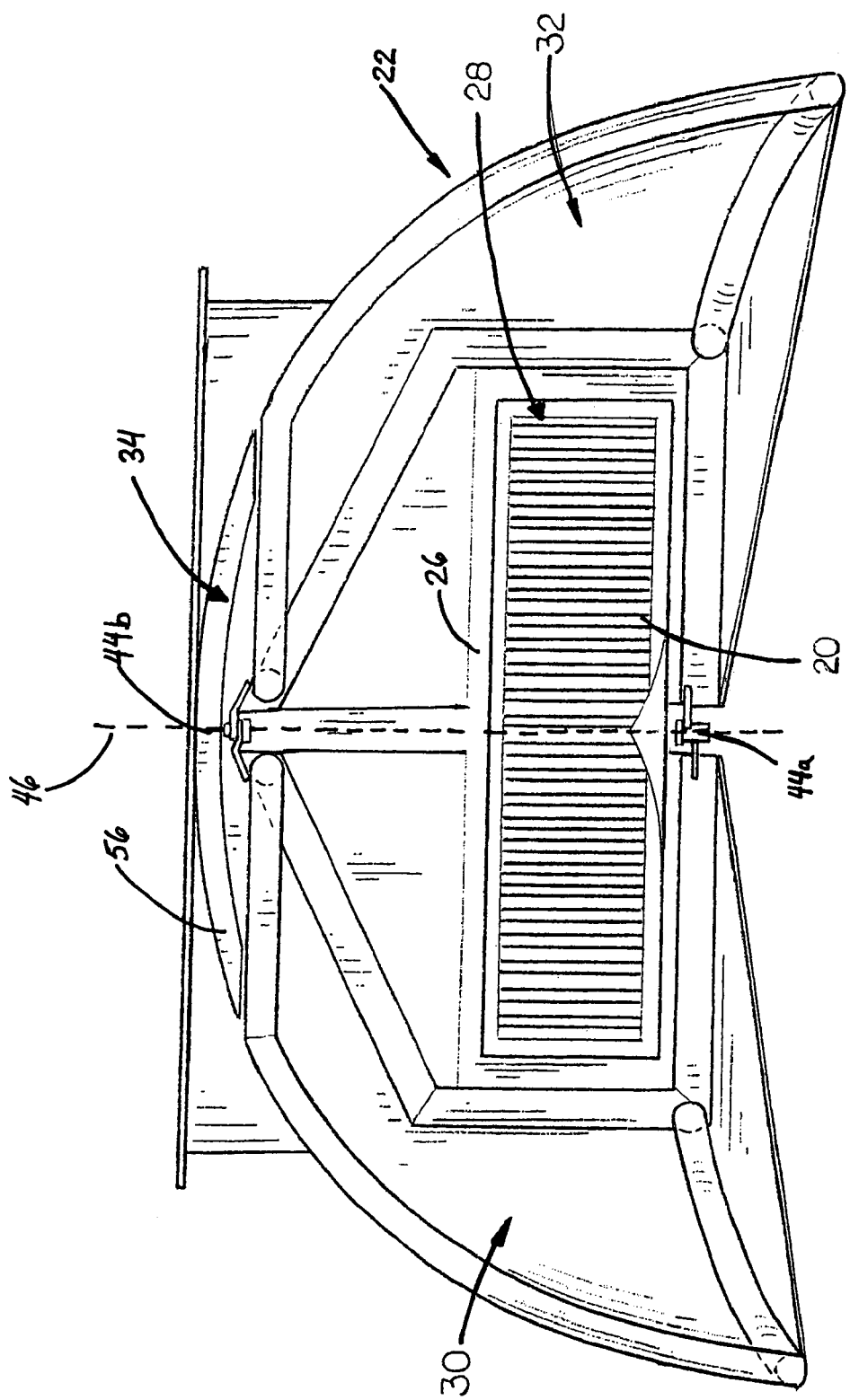
FIG. 2 is a rear view of the bagging machine of FIG. 1.

As noted above, tunnel 22 may include a third tunnel member 34. Third tunnel member 34 may be provided in a number of configurations, one of which is illustrated in FIGS. 1 and 2. As shown in FIGS. 1 and 2, third tunnel member 34 includes a shroud 56 secured at its forward end to faceplate 26, frame 12, or bagging machine 10. Shroud 56 extends rearwardly over the upper ends of the first and second tunnel members 30, 32 to close the space therebetween when the first and second tunnel members are separated. Shroud 56 will be described in greater detail in connection with FIGS. 7 and 8.

FIGS. 5 and 6 illustrate an alternative embodiment of the third tunnel member 34. In some embodiments, third tunnel member 34 may include a first panel 60 and a second panel 64 operatively coupled together, such as by hinge 68, as shown in FIGS. 5 and 6. First panel 60 is also operatively coupled to the upper end 36*a* of the first tunnel member 30 at hinge 62 and second panel 64 is also coupled to the upper end 36*b* of the second tunnel member 32 at hinge 66. When tunnel 22 is in an open configuration, the first and second panels 60, 64 cover the space between first and second tunnel members 30, 32. And when in a closed configuration, the first and second panels 60, 64 collapse into the interior of the tunnel through rotation at hinges 62, 66, 68. The use of a hinge to couple the first and second panels to the upper ends of the first and second tunnel members and to couple the first and second panels is illustrative of conventional coupling devices, any of which may be used to operatively couple the respective components.

In other embodiments similar to that shown in FIGS. 5 and 6, third tunnel member 34 may be formed of flexible material, such as high-strength fabrics, composite materials, plastics, etc. In such embodiments, the third tunnel member may include a first side edge and a second side edge. The first side edge may be operatively coupled to the upper end 36*a* of the first tunnel member 30 at hinge 62 and second panel 64 may be coupled to the upper end 36*b* of the second tunnel member 32 at hinge 66. The flexible material may be of single-piece or multi-piece construction and may include additional coupling mechanisms as necessary.

Figure 7:
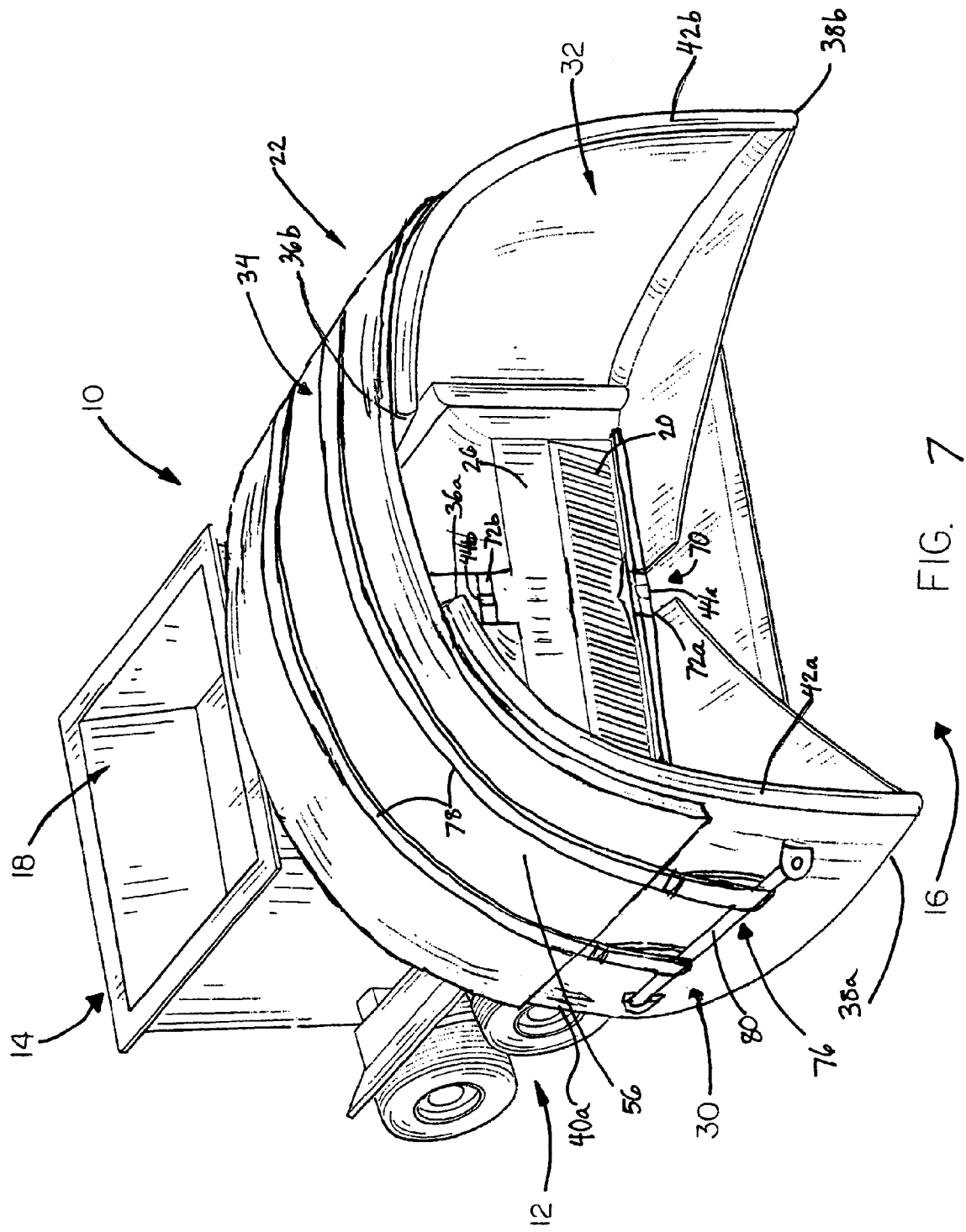
FIG. 7 is a rear perspective view of a bagging machine having a first and second tunnel member according to the present disclosure.
Figure 8:
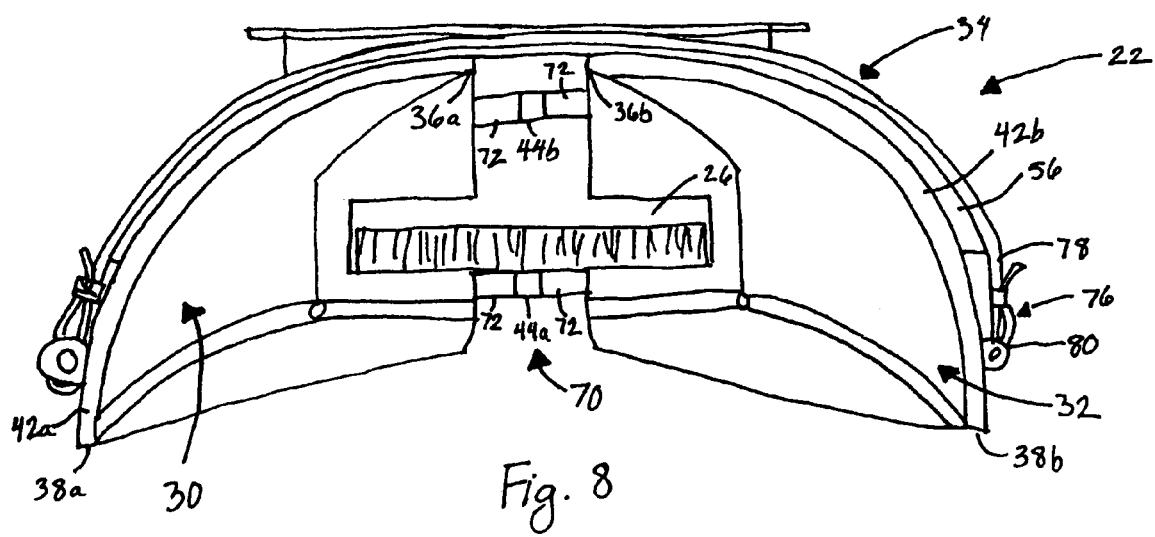
FIG. 8 is a rear view of the bagging machine of FIG. 7.
Figure 9:
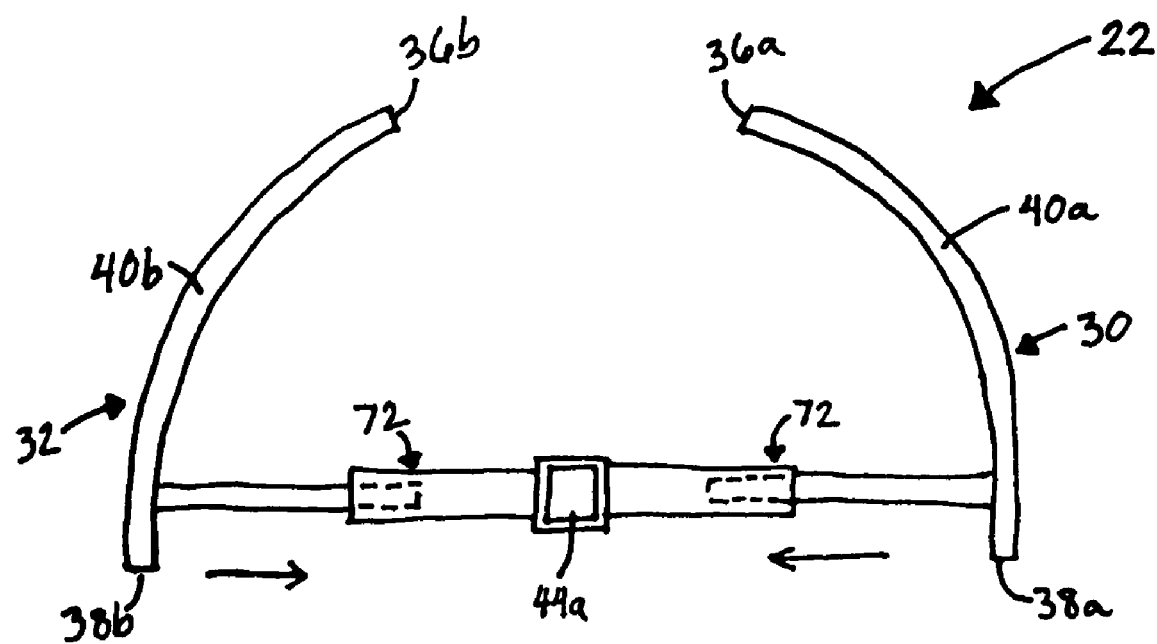
FIG. 9 is a frontal view of the tunnel illustrated in FIG. 7 showing a coupling assembly according to the present disclosure.

FIGS. 7-9 illustrate additional features that may be incorporated into bagging machines according to the present disclosure. It can be seen from these figures that bagging machine 10 and tunnel 22 may include many of the same components illustrated in FIGS. 1-6, including frame 12, first tunnel member 30, second tunnel member 32, and third tunnel member 34. some of the features illustrated in FIGS. 7-9 allow tunnel 22 to be configured in at least two open positions having different widths or diameters.

With reference to FIGS. 7-9, tunnel 22 includes a first tunnel member 30 and a second tunnel member operatively associated or joined by a coupling assembly 70. Coupling assembly 70 may include one or more hinges 44. Hinges 44 may be configured to couple first tunnel member 30 to second tunnel member 32. For example, hinges 44 may be configured as shown with a single vertical axis of rotation. While two hinges 44*a*, 44*b* are illustrated in FIG. 9, greater or fewer hinges may be used. Alternatively, hinges 44 may be configured to separately couple first tunnel member 30 and second tunnel member 32 to frame 12 or another component of bagging machine 10. For example, hinges 44 of coupling assembly 70 may be horizontally spaced-apart with one or more hinge coupling first tunnel member 30 to bagging machine 10 and one or more additional hinge coupling second tunnel member 32 to bagging machine 10.

As more clearly seen in FIG. 9, coupling assembly 70 also may include a first hinged extension 72*a* and a second hinged extension 72*b*. First and second hinged extensions 72*a*, 72*b* may be coupled to hinges 44 and operatively coupled to first and second tunnel members 30, 32, respectively. Coupling assembly 70, and specifically hinges 44, allow first and second tunnel members 30, 32 to be moved between an open position and a closed position, as described above in connection with FIGS. 1-6. Additionally, coupling assembly 70, and specifically hinged extensions 72, allow first and second tunnel members to be positioned in more than one open configuration. As illustrated in FIG. 9, first and second tunnel members 30, 32 are disposed in the open position to form a wide tunnel, sufficient to accommodate larger diameter bags. First and second tunnel members 30, 32 may also be moved inwardly in the direction of arrows 74 to be configured in additional open positions to accommodate bags of different diameters. As used herein, the term hinged extension refers to any member, or combination of members that is operatively coupled to hinges 44 and to first and second tunnel members 30, 32 to allow the first and second tunnel members to move between at least two open configurations. Hinged extension 72 may include one or more rods, beams, telescoping members, or other conventional structures.

The coupling between hinged extensions 72 and first and second tunnel members 30, 32 may take on any suitable form. For example, telescoping members may be provided to the hinged extensions and the tunnel members to allow a sliding relationship between hinged extensions 72 and first and second tunnel members 30, 32. The adjustable coupling of first and second tunnel members 30, 32 to the hinged extensions may allow for adjustment of the first and second tunnel members to predetermined positions corresponding to specific diameter bags, such as 8 foot bags, 10 foot bags, 12 foot bags, etc. Such configuration of the coupling may be provided through the use of registers or indexes in the telescoping members or through other suitable positioning devices designed to secure the first and second tunnel members in place.

Alternatively, hinged extensions 72 and first and second tunnel members 30, 32 may be adjustably coupled to allow for positioning of the first and second tunnel members at any point among a range of dimensions to accommodate bags of various diameters, such as ranging from 6 foot diameter bags up to 16 foot diameter bags. Any suitable device may be used to hold the first and second tunnel members in the user-selected position. For example, clamps, levers, locking mechanisms and the like may be provided on the hinged extensions or tunnel members to hold them in place. Alternatively, adjustable length straps, cables, or telescoping beams, may be provided that span between the first and second tunnel members to maintain the desired position. While most bags are provided in certain defined dimensions, the actual dimensions of the bags in use can vary by six inches or more. By not providing pre-determined positions for the first and second tunnel members, tunnel 22 may be adapted to accommodate such variations in bag dimensions.

As with the embodiment described in connection with FIGS. 1-6, tunnel 22 of FIGS. 7-9 may be manually movable between the closed position and the several open positions.

Bagging machine 10 also may include actuating assemblies and/or additional coupling assemblies. The actuating assembly may be similar to those described above, and may cooperate with coupling assembly 70 or with the additional coupling assemblies that may be used to hold the first and second tunnel members in the desired position. In one exemplary actuating assembly, hydraulic cylinders may be disposed in association with the telescoping members illustrated in FIG. 9. The actuating assemblies operatively associated with the tunnels of the present disclosure may be controlled and operated by the user in any conventional manner.

As noted above and as illustrated in FIGS. 7 and 8, tunnel 22 may include third tunnel member 34. Third tunnel member 34 may be configured as a shroud 56 spanning between upper ends 36a, 36b of first and second tunnel members 30, 32 and extending from the forward ends 40 of the tunnel members to the rearward ends 42 of the tunnel members. Shroud 56 may be formed of flexible material to allow for movement of first and second tunnel members 30, 32 between the closed position and one or more open positions. In some configurations of tunnel 22, shroud 56 may extend down the sides of the first and second tunnel members as shown in FIGS. 7 and 8 to allow for expansion of the tunnel to greater diameters as described above. Shroud 56 may be sized to completely cover the region between the upper ends of the first and second tunnel members even when the first and second tunnel members are in their outermost positions.

Shroud 56 may be operatively coupled to first and second tunnel members 30, 32 in a number of ways. A securing assembly 76 may be provided to hold the third tunnel member 34 in the desired, user-selected position during operation of the bagging machine. Depending on the configuration selected, securing assembly 76 may also function to support the coupling assembly to hold first and second tunnel members 30, 32 in the desired open or closed positions.

One example of such securing assembly 76 is shown in FIGS. 7 and 8 as straps 78 and associated tie-rod 80. The pressure from the material being packed in the bag will exert a large amount of upward force on third tunnel member 34 in the area where the third tunnel member spans between first and second tunnel members 30, 32. Accordingly, securing assembly 76, and straps 78 when used, should be configured to withstand such pressures. Straps 78 may be made of flexible fabric, such as heavy-duty belt material, or any other material suitable for the conditions under which it will be used, such as cables, cords, chains, etc. In some embodiments, the material used to form the straps may be selected so as to reduce wear on the third tunnel member 34. Straps 78 also may be made of more than one material type. For example, each strap may include a heavy-duty fabric material where the strap contacts the third tunnel member 34 and may include chains or other materials at the ends of the straps.

In the example shown in FIGS. 7 and 8, straps 78 are coupled to a tie-rod 80 disposed on both the first and second tunnel member 30, 32. Tie-rod 80 is one example of the many conventional ways the straps may be coupled to the first and second tunnel members. Buckles, clamps, levers, locks, and other conventional devices also may be used to maintain the straps and other components of the securing members in their desired configuration. In some embodiments, weights may be coupled to the side edges of the third tunnel member to hold it in place. Other methods of securing the third tunnel member are described in connection with the figures described below and may be adapted for use in connection with tunnels such as those described in connection with FIGS. 1 and 2 and FIGS. 7 and 8.

Figure 10:
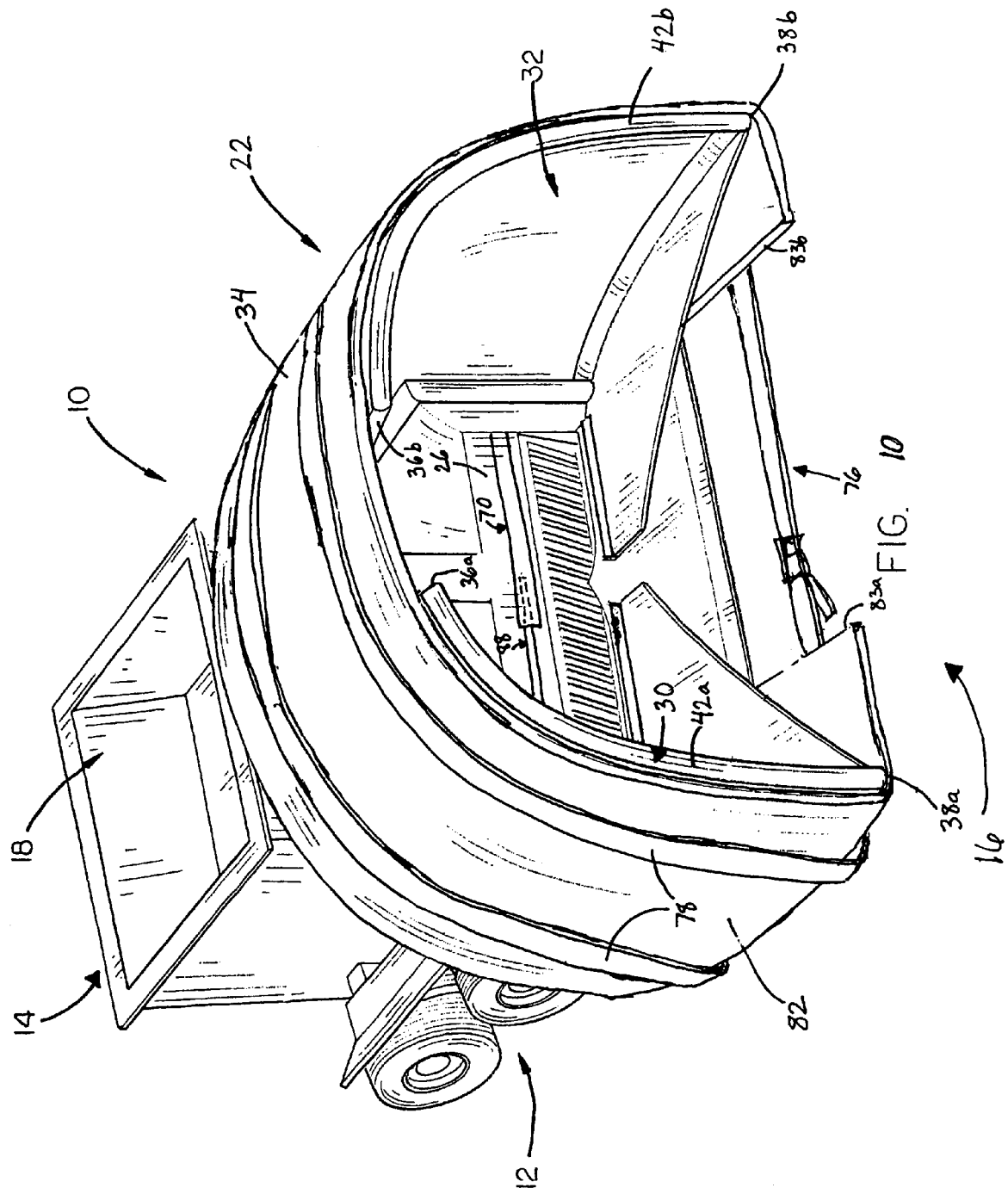
FIG. 10 is a rear perspective view of a bagging machine having a first and second tunnel member according to the present disclosure.

With reference to FIG. 10, bagging machine 10 is illustrated with another example of tunnel 22, similar to the embodiments illustrated in FIGS. 1-9. As shown, tunnel 22 includes first and second tunnel members 30, 32 and third tunnel member 34, each of which may be in accordance with any of the embodiments described above. As described above, first and second tunnel members 30, 32 are configured to be selectively movable towards one another and away from one another and may be coupled together by a coupling assembly 70.

Figure 11:
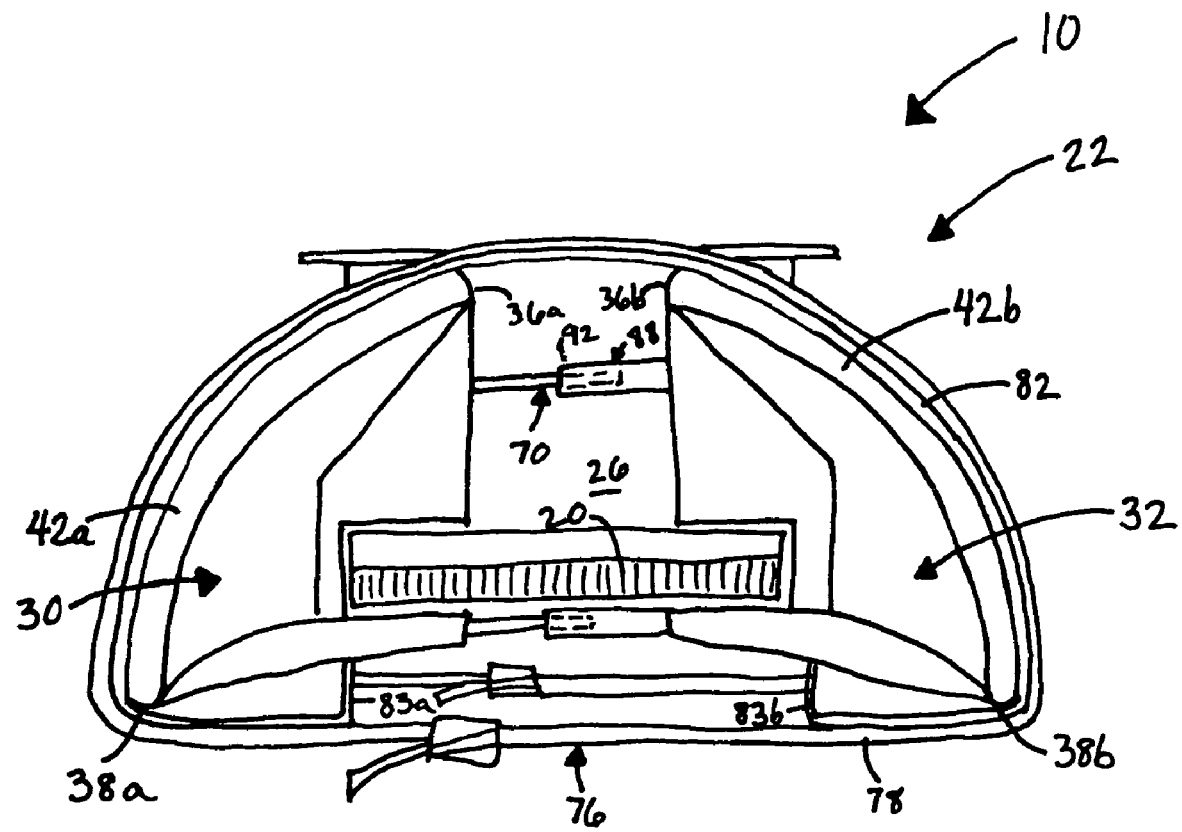
FIG. 11 is a rear view of the bagging machine of FIG. 10.
Figure 12:
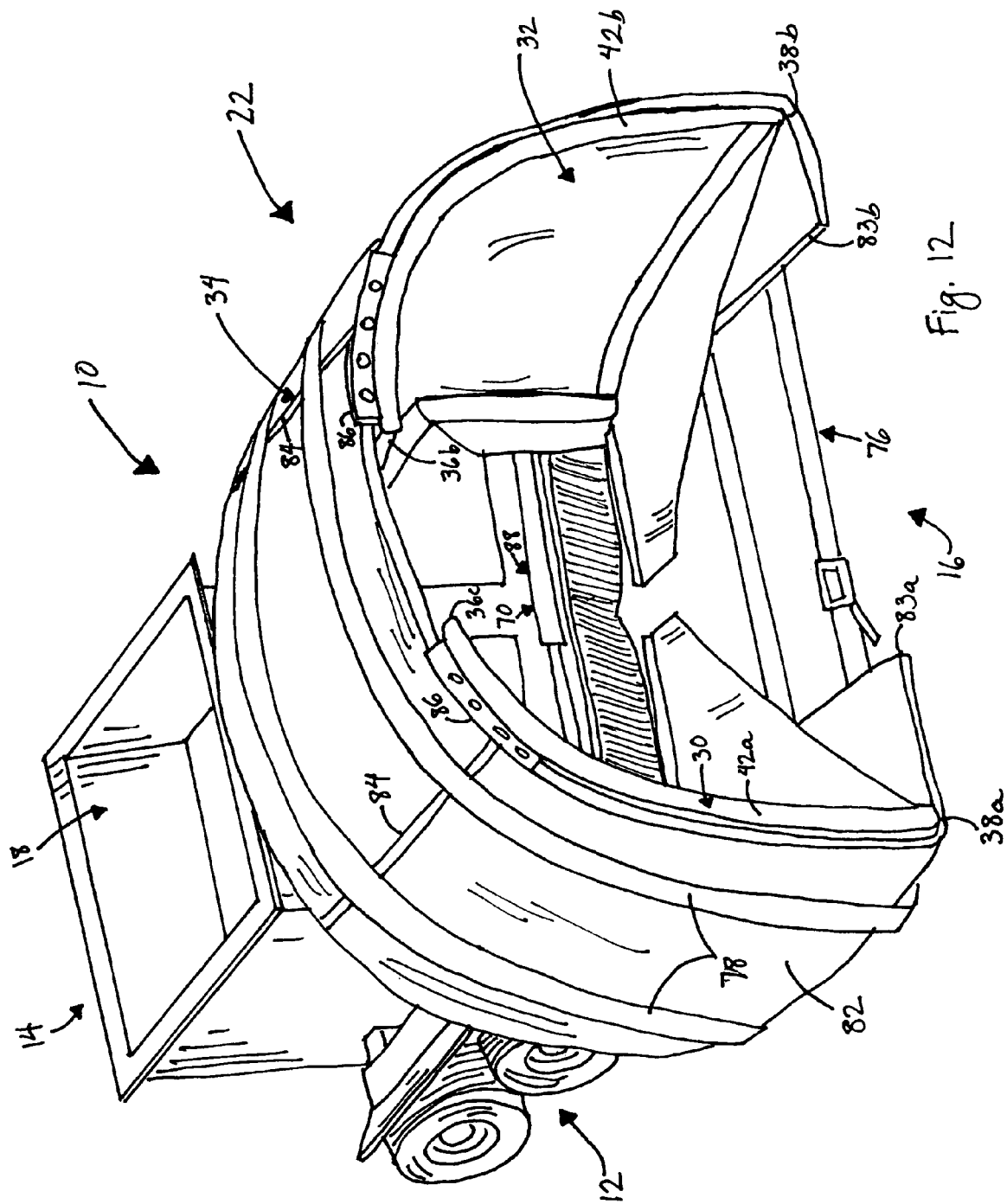
FIG. 12 is a rear perspective view of a bagging machine having illustrative guide tracks on the tunnel according to the present disclosure.
Figure 13:
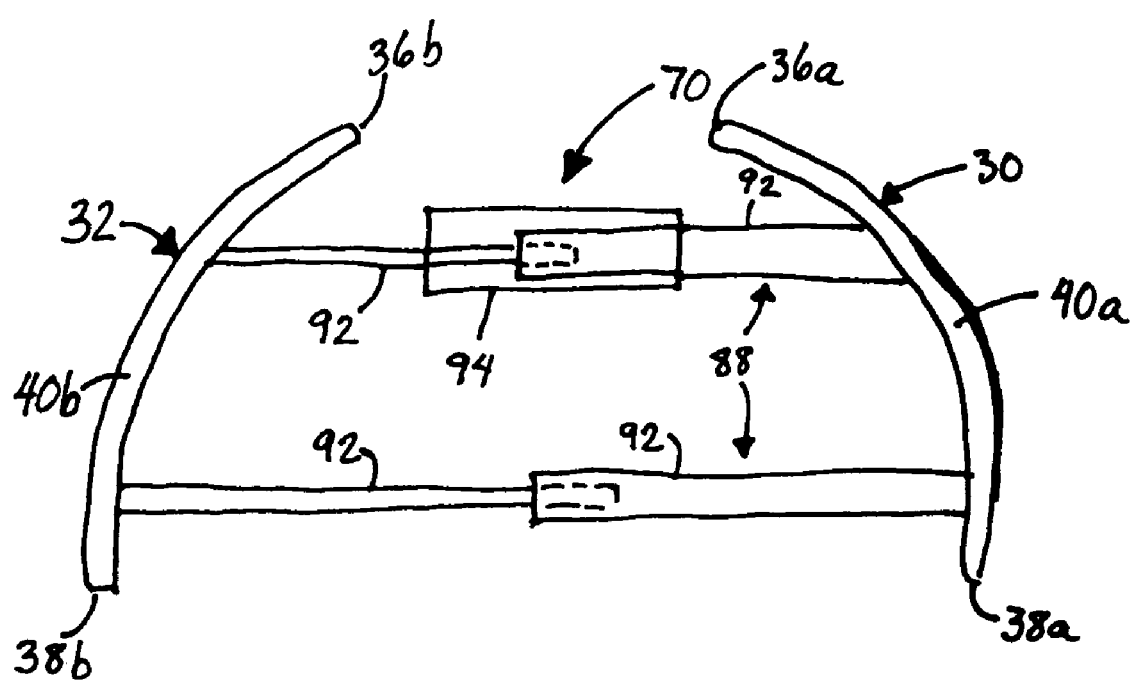
FIG. 13 is a frontal view of tunnel illustrated in FIG. 10 showing a coupling assembly according to the present disclosure.

With continued reference to FIG. 10 and with reference to FIGS. 11-13, coupling assembly 70 may omit hinge 44, as described above, and may be adapted to allow tunnel 22 to be configured in multiple open positions to accommodate bags of varying diameters. Coupling assembly 70 may be configured to allow tunnel 22 to adjust in a number of ways, including adjusting the spacing between the upper ends 36a, 36b of the first and second tunnel members, adjusting the spacing between the lower ends 38a, 38b of the first and second tunnel members, and adjusting the spacing between the upper ends 36a, 36b and between the lower ends 38a, 38b of the first and second tunnel members. In the example shown in FIGS. 10-13, first and second tunnel members 30, 32 are configured such that the upper ends and the lower ends are selectively movable towards one another or away from one another in tandem.

Third tunnel member 34 is illustrated in FIGS. 10 and 11 as a wrap 82. Third tunnel member 34 may also be configured according to the descriptions provided above, such as the shroud of FIG. 8 or folding members of FIGS. 6 and 7. Wrap 82 may be configured to extend from side edge 83a to side edge 83b at least from the lower end 38a of the first tunnel member to at least the lower end 38b of the second tunnel member, spanning between the upper ends 36a, 36b of the first and second tunnel members. As can be seen in FIG. 10, wrap 82 also may be configured to extend from the forward ends 40 to the rearward ends 42 of the first and second tunnel members to completely cover any separation that may be created between the upper ends of the first and second tunnel members. The extended length of wrap 82 compared to shroud 56 may allow for greater variations in the diameter of tunnel 22. In wider configurations of tunnel 22, side edges 83 of wrap 82 may be drawn above the lower ends of tunnel members 30, 32.

As noted above, third tunnel member 34 may alternatively be formed of a rigid material such as steel or aluminum. If this is the case, the curvature of the third tunnel member should complement the curvature of each of the first and second tunnel members to form a substantially semicircular tunnel. Alternatively, the third tunnel member may be shorter and more like the cover shown in my co-pending parent application Ser. No. 10/350,680.

Third tunnel member 34 may be coupled to first and second tunnel members 30, 32 in accordance with the description provided above. For example, securing assembly 76 in the form of straps 78 may be provided to hold the third tunnel member in position. Straps 78 may be coupled to tie-rods 80 as described above when third tunnel member 34 is a shroud. Alternatively, as shown in FIGS. 10 and 11, straps 78 may be configured to extend around tunnel 22 forming a closed loop with each end of the strap provided with conventional length adjusting mechanisms to allow the user to tighten the straps to the desired length when the tunnel members are in the desired position. Straps 78, whether coupled to tie-rods, to the first and second tunnel members, or wrapped around the tunnel may assist in coupling the first and second tunnel members and/or in holding the first and second tunnel members in the desired open position.

While not necessary, first and second members may be provided with guide tracks along the rearward and/or forward ends to help maintain third tunnel member 34 in the desired position, such as to prevent the third tunnel member from sliding off the rearward end. Such guide tracks are not necessary as securing assembly 76 may provide sufficient retaining force. The guide tracks may be upwardly projecting flanges provided to the forward and rearward ends of the first and second tunnel members or may be similar to the grader edge provided on many conventional tunnels.

With reference to FIG. 12, the guide tracks 86 may be configured to cooperate with the securing assembly 76. In this example of securing assembly 76, a rigid securing bar 84a, 84b may be coupled to third tunnel member 34. First and second tunnel members 30, 32 may be provided with a guide track 86a, 86b along the forward and rearward edges. When a shroud is used as third tunnel member 34, the securing bars 84 may be coupled to the side edges of the shroud and the shroud may be sized such that the side edges and associated securing bars are configured to travel within the guide tracks. When a wrap is used as the third tunnel member, securing bars 84 may be incorporated into the wrap material at two or more points along its length configured to align with guide tracks 86.

Each bar 84 and the associated third tunnel member 34 may be adapted to move within the guide tracks 86 as first and second tunnel members are moved together and apart. As tunnel members 30, 32 are adjusted toward each other, securing bars 84a, 84b may be configured to move down in tracks 86a, 86b to keep the third tunnel member taut. Guide tracks 86 and securing bars 84 may be provided with selectively interlocking features to enable the securing bars to be locked in place during use and conveniently adjustable within the tracks when tunnel 22 is resized. In some embodiments, the movement of the securing bars and the third tunnel member within the guide tracks may be motorized to provide for easier operation. In some embodiments, the motorized movement of the third tunnel member within the guide tracks may be configured to be in harmony with a motorized actuating assembly that controls the adjustment of the first and second tunnel members to prevent the securing bars from hanging up during the movement of the first and second tunnel members.

With continued reference to FIGS. 10-12 and with reference to FIG. 13, a coupling assembly 70 for use with tunnel 22 is illustrated. FIG. 13 illustrates the first and second tunnel members 30, 32 in an open position having a given width. The width of the open position may correspond to the diameter of a bag or container into which grain, silage, compost, or other agricultural material is packed. For example, the open position of the first and second tunnel members 30, 32 may provide a tunnel having a width ranging from at least about 4 feet to as large as 20 feet. Widths smaller or larger than this are also possible, depending on the material being bagged and the circumstances in which the bagging machine is being used. As described above, coupling assembly 70 may be configured to allow tunnel 22 to be positioned in a number of predetermined widths, such as 8 feet, 10 feet, 12 feet, etc. Alternatively, coupling assembly 70 may be configured to allow tunnel 22 to be positioned at any width in the range from minimum to maximum widths, such as from 6 foot to 18 foot widths. Coupling assembly 70 may include levers, lock-outs, positioning clamps, or other mechanisms to hold the tunnel members in the desired positions.

In some embodiments, the first and second tunnel members 30, 32 are coupled by a coupling assembly 70, as described above. Coupling assembly 70 may include one or more transverse members 88 extending between the first and second tunnel members, as shown in FIG. 13. Examples of such transverse members include telescoping members, such as rods or beams, cables, cords, chains, etc. The coupling assembly 70 may be disposed at the forward ends of the first and second tunnel members 30, 32 and may be configured as part of the face plate, as a mounting frame disposed between the mobile bagging machine frame and the tunnel 22, or as part of the tunnel 22 to be coupled to the bagging machine.

Additionally, coupling assembly 70 may include transverse members 88 disposed rearwardly of the forward end of tunnel 22, such as in the midsection or adjacent the rearward end of tunnel 22. In some configurations, transverse members 88 may be configured to extend from first tunnel member 30 adjacent the forward end thereof to a position on second tunnel member 32 rearward of the forward end thereof, in a diagonal configuration, as will be described in more detail below. Transverse members 88 may extend between the first and second tunnel members 30, 32 adjacent the upper ends 36 thereof, adjacent the lower ends 38 thereof, or both.

With reference to FIG. 13, coupling assembly 70 may include transverse members 88. Transverse members 88 may include two or more telescoping members 92. In some embodiments, transverse members 88 may include a cover member 94 disposed over the intersection between the telescoping members 92. Transverse members 88 may include more than two telescoping members 92. For example, there may be three telescoping members with the first member adapted to telescope into the second member and the second member adapted to telescope into the third member. The use of additional telescoping members may allow greater variability in the size of the tunnel. Additional configurations may be implemented to allow more or less variability, such as multiple pairs of telescoping members, hinged members, or combinations of hinged and telescoping members.

Coupling assembly 70, including transverse members 88, are not limited to rigid beams or rods. Transverse members 88 may include cables, ropes, chains, straps, or other flexible coupling members extending between the first and second tunnel members. In some embodiments, as discussed above, the securing assembly that retains third tunnel member 34 in position also may be adapted to couple the first and second tunnel members in the desired position.

Figure 14:
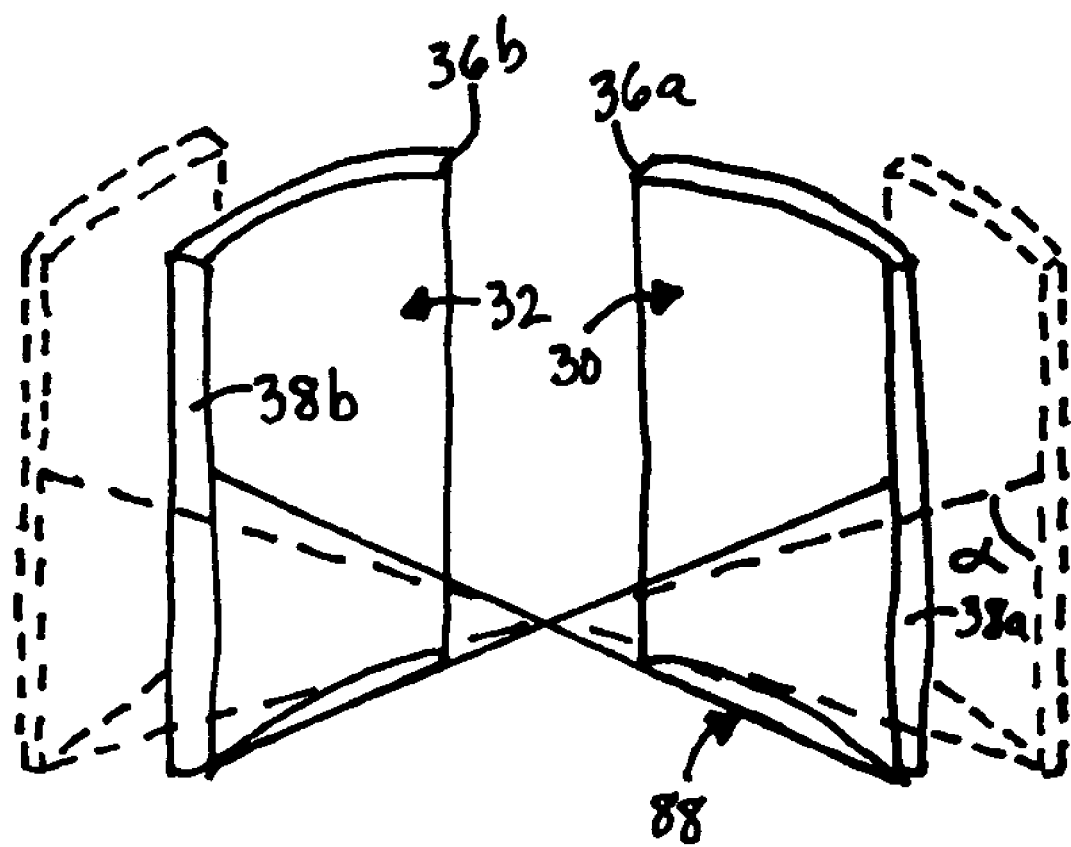
FIG. 14 is a bottom view of a tunnel according to the present disclosure showing an illustrative coupling assembly.

FIG. 14 illustrates a bottom view of tunnel 22 including coupling assembly 70. As shown in FIG. 14, coupling assembly 70 includes diagonally disposed transverse members 88. As discussed briefly above, the connection point of transverse member 88 to the first tunnel member and connection point of transverse member 88 to the second tunnel may be offset from each other such that one is disposed forwardly of the other, resulting in a diagonally disposed transverse member 88. Transverse members 88, as shown in FIG. 14, may include telescoping members or may include flexible coupling members, as discussed above. Additionally, cover members 94 may be included to protect the interface between telescoping members, when present, or to protect other parts of the transverse members.

In some embodiments, transverse members 88 may be hingedly coupled to first and second tunnel members 30, 32 such that the angle $\alpha$ between the transverse member and the tunnel member can change as the tunnel members are moved to place tunnel 22 in different configurations. As illustrated in FIG. 14, the angle $\alpha$ may decrease as the tunnel members are moved apart and may increase as the tunnel members are moved together. In other embodiments, one or more of the ends of transverse members 88 may be adjustably, or slidingly, coupled to the first and/or second tunnel members. Other relationships between the transverse members 88 of coupling assembly 70 and first and second tunnel members 30, 32 may be implemented to allow adjustment of the tunnel width.

As has been discussed, tunnel 22 is adapted to be configured in at least two different positions. In some embodiments, first and second tunnel members 30, 32 may be moved between positions manually. That is, a user may push or pull on the tunnel members to put them in the proper spaced-apart relationship and then secure them in place through use of a coupling assembly, as described above. In other embodiments, an actuating assembly may be used to facilitate the adjustment of the first and second tunnel members.

As described above, an actuating assembly may be configured to mechanize the movement of first and second tunnel members 30, 32 between the two or more configurations. The actuating assembly may include a variety of suitable mechanisms such as gears, pulley, levers, hydraulic cylinders, and the like. In some embodiments, the actuating assembly may be configured to be operatively associated with the coupling assembly. For example, one or more hydraulic cylinders may be disposed within the transverse members of the coupling assembly. The actuating assembly and the coupling assembly may be operatively associated in other ways, such as the actuating assembly having fixed stop points that correspond with fixed stop points of the coupling assembly.

Bagging machines 10, as described above, include tunnels 22 having first and second tunnel members 30, 32. In each of these configurations described thus far, bagging machine 10 and/or tunnel 22 can be understood to include a first tunnel member 30, a second tunnel member 32, and a coupling means for operatively associating the first and second tunnel members. The coupling means may be adapted to allow the first and second tunnel members to be positioned in at least a first and a second position. In some embodiments, the first position is a closed, inoperative position and the second position is an open, operative position. In other embodiments, the coupling means may be configured to allow a closed position and one or more open positions. In still other embodiments, the coupling means may be adapted to allow a plurality of open, operative positions and no positions that are inoperative. Additionally, actuating means may be provided to facilitate or cause the movement of the first and second tunnel members between the first and second positions. The actuating means may be incorporated into the coupling means, may be adapted to be operatively associated with the coupling means, or may be adapted to operate separate from the coupling means.

Figure 15:
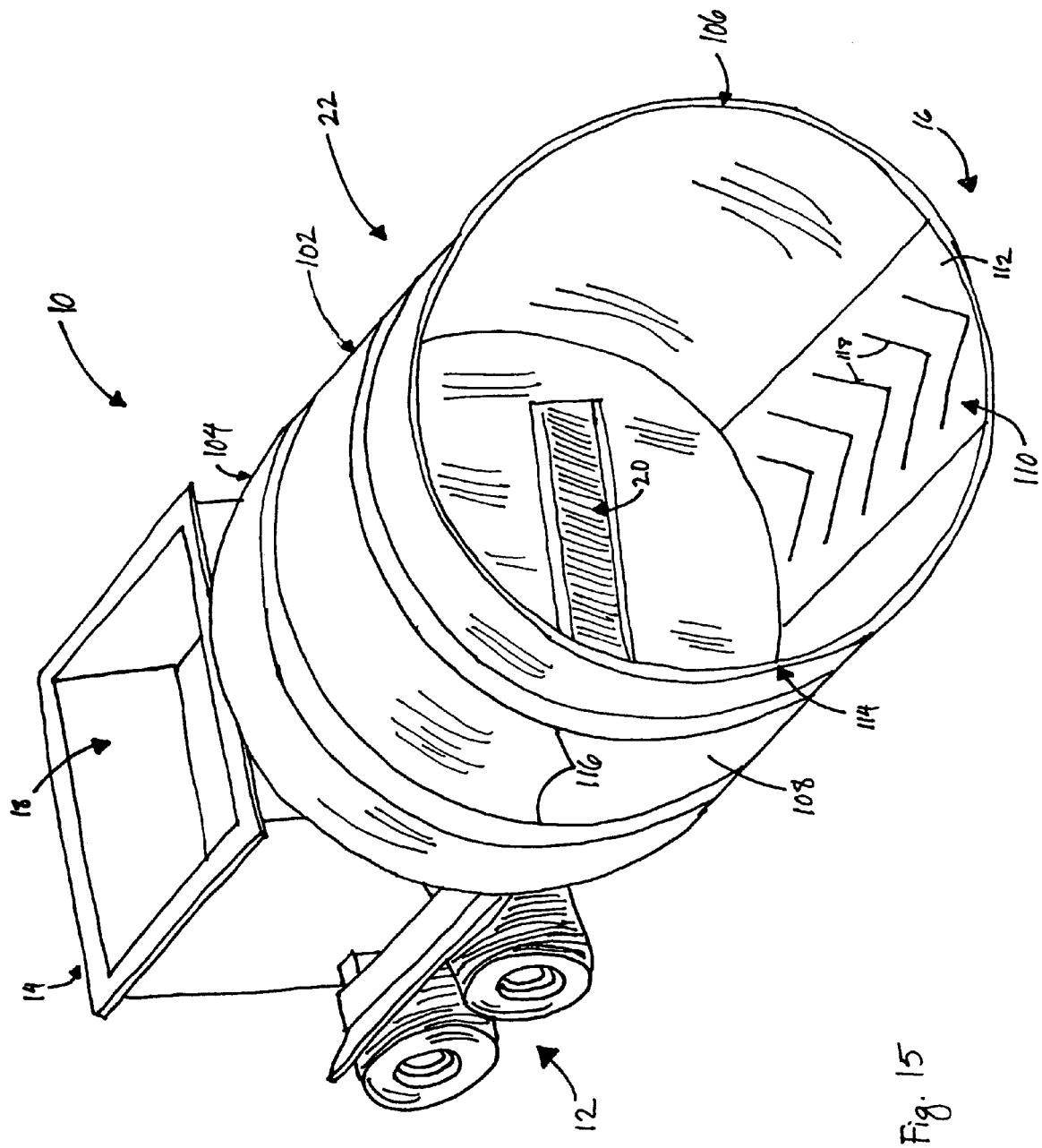
FIG. 15 is a rear perspective view of a bagging machine according to the present disclosure showing an illustrative sleeve tunnel including a shaping assembly, a density control assembly, and a length adjusting system.
Figure 16:
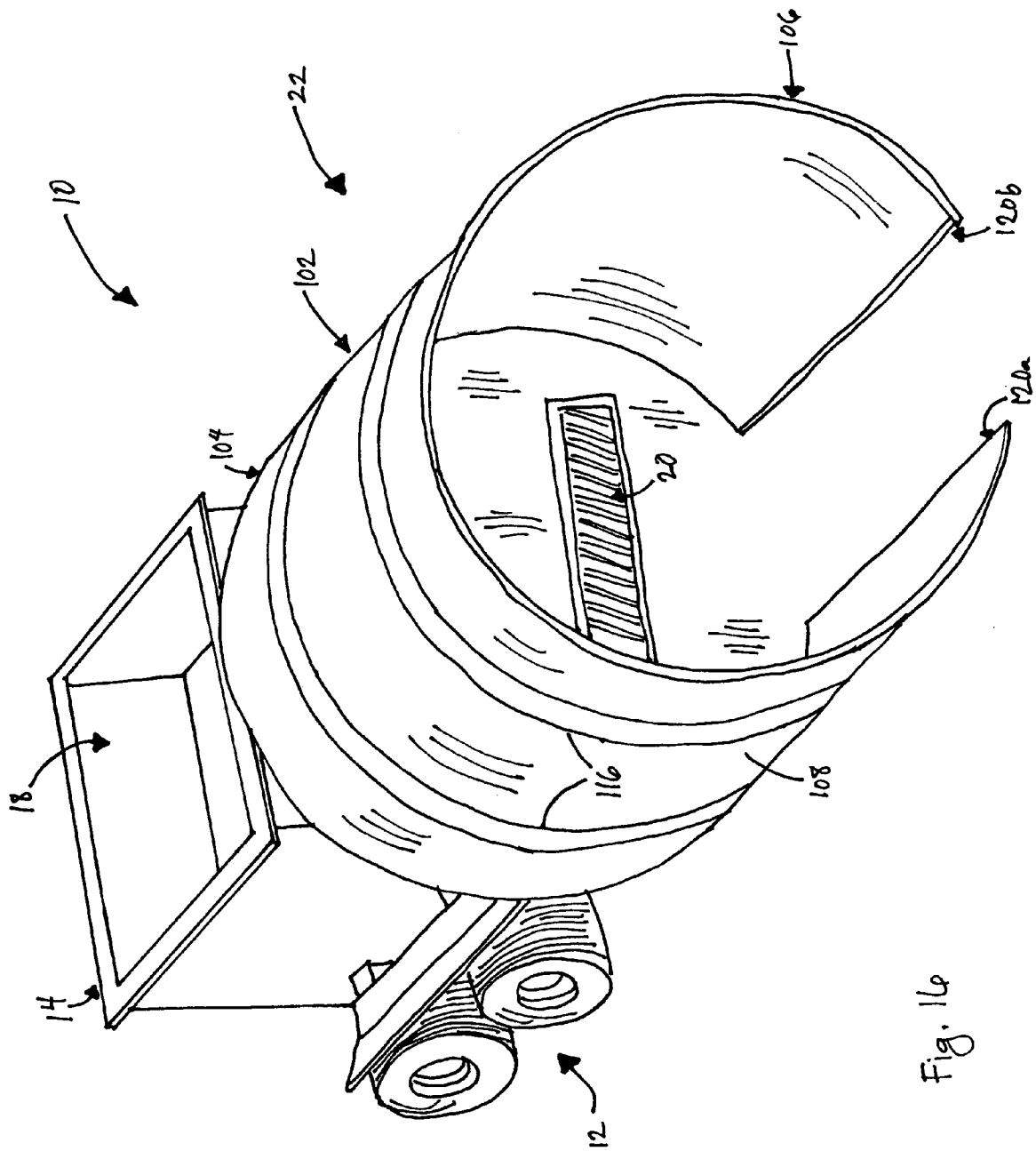
FIG. 16 is a rear perspective view of a bagging machine according to the present disclosure showing a sleeve tunnel having an adjustably open bottom.
Figure 17:
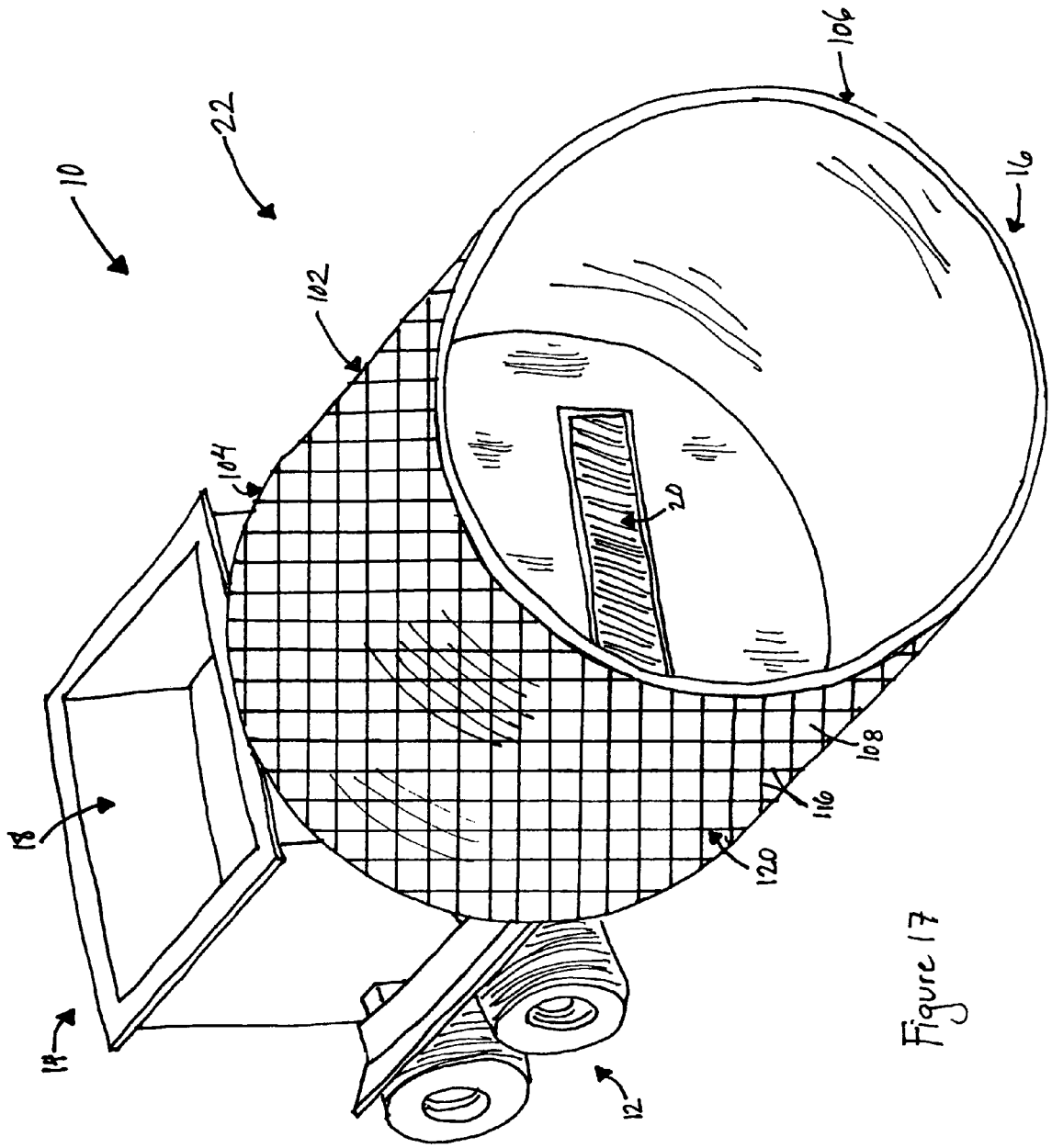
FIG. 17 is a rear perspective view of a bagging machine according to the present disclosure showing an illustrative sleeve tunnel and shaping assembly.

In some embodiments of bagging machine 10, such as illustrated in FIGS. 15-17, tunnel 22 includes a sleeve 102. Sleeve 102 has a forward end 104 and a rearward end 106. Sleeve 102 also has a perimeter 108 that may be defined at least partially by flexible material. Sleeve 102 may be adapted to be coupled to bagging machine 10, to mobile frame 12, or to a faceplate 26 disposed between mobile frame 12 and tunnel 22. Flexible sleeve 102 may be operatively associated with the rearward end of mobile frame 12 and adapted to receive material from the material packing assembly of the bagging machine.

As discussed, in some embodiments, faceplate 26 is mounted on mobile frame 12 and tunnel 22 may be removably or adjustably coupled to the faceplate. In other embodiments, faceplate 26 is adjustably coupled to tunnel 22 and the faceplate may be removably coupled to mobile frame 12. In still other embodiments, faceplate 26 may be omitted and tunnel 22 may be adjustably or removably coupled to mobile frame 12 or other component of bagging machine 10.

In some embodiments including tunnel 22 according to any one of the figures of the present application, the tunnel may be configured to couple to the bagging machine such that air is not allowed to enter the tunnel through the coupling. That is to say, the coupling between the tunnel and the bagging machine, in some embodiments, may be at least substantially impervious to air. In other embodiments, the coupling between tunnel 22 and bagging machine 10 may be configured to encourage air flow into the tunnel. The configuration of the coupling between the tunnel and the bagging machine may be selected based on the type of material being bagged or the purpose for which the material is being bagged. In some embodiments of bagging machine 10, the configuration of this coupling may be user-selectable such that, for a given bagging machine-tunnel combination, a user is able to configure the coupling between them to either allow or prevent airflow into the tunnel via the coupling.

Sleeve 102 may be at least partially formed of flexible material. Sleeve 102 incorporating flexible material allows tunnel 22 to be more conveniently stored or transported. Additionally, when tunnel 22 includes flexible material, tunnel 22 may be lighter than when constructed of steel or other rigid materials. Examples of flexible material that may be suitable for sleeve 102 include fabric materials, plastic materials, composite materials, or other materials or combinations of materials that allow sleeve 102 to be stored in a collapsed condition and used in an open condition.

The use of flexible material to form some or all of tunnel 22 has been discussed in connection with several of the figures in the present application. As has been discussed above, depending on the materials being bagged and the purpose for which it is being bagged, it may be desirable to limit the amount of air that can enter into the bag. Accordingly, the materials used to construct tunnel 22 may be selected to allow or limit air flow through the walls of the tunnel. For example, materials that are substantially impervious to airflow may be used to construct tunnel 22. Alternatively, substantially impervious materials may be used to seal joints or surfaces that otherwise would allow undesirable airflow into the tunnel. In other embodiments, a substantially impervious liner may be implemented in cooperation with tunnel 22 to further limit airflow into the tunnel.

As illustrated in FIG. 15, tunnel 22 includes a sleeve 102 that has a perimeter 108 defining a substantially circular passageway. Sleeve 102 may have a perimeter defining other cross-sectional geometries as well. When a fabric material is used to form sleeve 102 for example, the sleeve may include bonding patterns, structured stitching, paneling, or other means to configure sleeve 102 in predetermined cross-sectional geometries including curved surfaces, linear surfaces, or a combination of linear and curved surfaces.

Rearward end 106 of sleeve 102 may be provided with a reinforced region 114. Reinforced region 114 may be simply a region where the flexible material is folded back on itself one or more times to strengthen the rearward end 106. Additionally, reinforced region 114 may be adapted to serve as a grader edge to help smooth the bag material as it passes over the tunnel. In some embodiments, reinforced region 114 may include a rope, a cord, a cable, or other flexible material disposed at the rearward end and operatively associated with sleeve 102 to be held in place. In some embodiments, the sleeve material may be folded back to form a channel in which the cord, rope, or other material may be disposed.

With reference to FIG. 15, sleeve 102 may include a shaping assembly 116. Shaping assembly 116, when included, may be configured to cooperate with the flexible material of sleeve 102 to define the cross-sectional geometry of tunnel 22. For example, shaping assembly 116 may be configured to maintain sleeve 102 in a circular cross-section. In some embodiments, shaping assembly 116 may include straps adapted to be wrapped around sleeve 102. In other embodiments, shaping assembly 116 may be incorporated into sleeve 102 such as by providing reinforced regions in the sleeve or permanently coupling straps or other reinforcing material to sleeve 102 to help the sleeve maintain its desired geometry.

In some embodiments, sleeve 102 may be adapted to have a fixed total length and to have a user-selectable operational length. A length adjusting system (not shown) may be operatively associated with sleeve 102. The length adjusting system may include one or more rearwardly extending members extending from adjacent the forward end of the sleeve to a rearward point on the sleeve. In some embodiments, the length adjusting system extends from a forward point where it is coupled to the bagging machine to a rearward point where it is coupled to the rearward end of the sleeve. In other embodiments, the length adjusting system may extend between a forward coupling with the shaping assembly to a rearward coupling with the shaping assembly. The length adjusting system may extend between any two locations that allow control over the length of the sleeve. The rearwardly extending members of the length adjusting system may be configured to pull a rearward portion of the sleeve forward to shorten the operational length of sleeve 102. The length adjusting system also may include a folding mechanism disposed in operative association with the rearwardly extending members. The folding mechanism may be configured to fold or otherwise collect the portion of the sleeve that is pulled forward to shorten the operational length of the sleeve.

The length adjusting system may be configured to allow a user to selectively increase or decrease the distance to which sleeve 102 extends rearwardly from bagging machine 10. In some embodiments, the length adjusting system may be configured to allow the user to set the length of the sleeve prior to beginning a given bagging operation and to use a constant length sleeve during the given bagging operation. In other embodiments, the length adjusting system may allow the user to control the length of the sleeve 102 during a given bagging operation such that the length can vary over time according to the user's preferences. By increasing the length of the sleeve, the total friction between the material being packed and the perimeter walls 108 may increase, which may increase the packing density in the bag. Shortening the length of the sleeve may produce the opposite result providing a lower density packed bag.

Adjusting the length of sleeve 102 is one of many ways that the packing density may be controlled. As discussed above, bagging machine 10 may include a density control assembly for setting or adjusting the packing density of the material being packed into the bag. While not necessary, sleeve 102 may include a lower portion 110 that is adapted to function as a drag member 112 for density control as described above and as described in previously incorporated patents and patent applications. Drag member 112 may include reinforcing layers of flexible material coupled to the lower portion 110 of sleeve 102. Alternatively, drag member 112 may be a separate component coupled at its side edges to side edges of the sleeve 102 to provide a continuous perimeter sleeve. Drag member 112 may be coupled at its forward end to mobile frame 12, faceplate 26, or other component of bagging machine 10. In some embodiments, drag member 112 may be coupled to bagging machine 10 in the same manner as sleeve 102. In other embodiments, the coupling between drag member 112 and bagging machine 10 may be configured to provide increased strength. Drag member 112 may include protrusions, ridges, bumps, or other structures in patterns or randomly positioned on the drag member surfaces. The protrusions may be disposed on the under side of the drag member, on the upper side of the drag member, or on both the upper and lower sides of the drag member.

Drag member 112 may be incorporated into sleeves 102 including a length adjusting system. In such embodiments, the length of drag member 112 may be configured to be adjusted or varied in cooperation with the operational length of sleeve 102. Increasing the length of drag member 112 is one way of increasing the surface area of the drag member disposed between the bagged material and the ground. As described above, increasing the surface area of the drag member disposed between the bagged material and the ground may increase the packing density of the material being bagged. In other embodiments, including embodiments with length adjustable sleeves, drag member 112 may be adapted to have a variable width. In such embodiments, the width of drag member 112 may be adjusted by providing one or more longitudinal folds in the drag member. The longitudinal folds may be configured to allow more or less of the drag member material to be folded onto itself to decrease the operational width of drag member 112.

Sleeve 102 may be configured to provide a tunnel having a predetermined diameter. Because sleeve 102 is flexible and allows for convenient storage and lightweight assembly, a user may own more than one sleeve with the sleeves having different diameters. For example, a user may own an 8 foot diameter sleeve, a 10 foot diameter sleeve, and/or a 12 foot diameter sleeve. Diameters smaller or larger may be used, depending on the operation and the size of the bag to be packed. Use of different sleeves having different diameters may allow a single bagging machine to be used with bags of different diameters reducing the equipment expenses of the user.

In other embodiments, sleeve 102 may be adapted to be configurable to have a user-selectable diameter. For example, a single sleeve may be configurable to have an 8 foot diameter, a 10 foot diameter, and/or a 12 foot diameter. In some embodiments sleeve 102 may be configurable to have smaller or larger diameters to coordinate with smaller or larger bags. Shaping assembly 116 may be adapted to allow a user to adjust the shape of sleeve 102. More specifically, shaping assembly 116 may be configured to allow the user to change the diameter of the sleeve to enable a single sleeve to be used with bags of different diameters. For example, shaping assembly 116 may include straps or other members disposed outside of sleeve 102. The length of the straps or other members may be adjustable through any conventional systems. In some embodiments, the shaping assembly may be adapted to allow the user to manually set the diameter of the sleeve, such as by manually shortening the length of the straps or other members. In other embodiments, the shaping assembly may be mechanically adjustable to facilitate the adjustment of the sleeve diameter.

With reference now to FIG. 16, sleeve 102 may not provide a continuous perimeter 108. As shown in FIG. 16, sleeve 102 may be formed by a length of flexible material having a forward end 104, a rearward end 106, and opposing side edges 120*a*, 120*b*. Sleeve 102 having opposing side edges 120 may be used with a shaping assembly 116 as illustrated in FIG. 16. Shaping assembly 116 may be adapted to draw opposing side edges 120 together to decrease the diameter of sleeve 102 or to separate the opposing side edges 120 to increase the diameter of sleeve 102. In some embodiments, opposing side edges 120 may overlap in narrower configurations of sleeve 102. In some embodiments, shaping assembly 116 may include straps that wrap around sleeve 102. The straps may have an adjustable length to allow the shaping assembly to adjust the diameter of the sleeve.

When sleeve 102 is configured with opposing side edges 120, tunnel 22 further may include a length adjusting system to allow the user to control the packing density of material packed in the bag. In some embodiments, a drag member may be provided to the bagging machine as an additional or alternative form of density control. The drag member (not shown) may be coupled to the bagging machine to extend rearwardly under sleeve 102. One or more drag members may be provided. In some embodiments, the one or more drag members may be configured to be selectively extendable. For example, the length of the one or more drag members may be adjustable. In embodiments with more than One drag member, the length of each drag member may be separately adjustable.

FIG. 17 illustrates another example of sleeve 102 including a shaping assembly 116. In FIG. 17, shaping assembly 116 includes crossing members that extend in opposing directions. In some configurations, shaping assembly may be configured as a net 120. As illustrated, the crossing members extending in opposing directions may extend in the longitudinal direction and in the circumferential direction. In other embodiments, the members forming net 120 may extend in other directions. In some embodiments, net 120 may be formed of members that extend in more than two directions.

Net 120 may be configured to provide both a shaping assembly and a length adjusting system. Net 120 may provide reinforcing structure to maintain the flexible sleeve in the desired cross-section geometry. Additionally, net 120 may be adapted to allow a user to gather portions of the net together to shorten the length of the sleeve or to reduce the diameter of the sleeve. Similarly, portions of net 120 may be let out to lengthen the sleeve or to increase the diameter of the sleeve. Suitable clamps, latches, or other devices may be provided to allow the adjustable net to be secured in the user-selectable configuration.

In some embodiments of sleeve 102, shaping assembly 116 may be configured to provide the structural definition and strength of the sleeve to reduce the demands on the flexible material forming the sleeve perimeter 108. In such embodiments, such as when shaping assembly 116 includes a net-like structure 120, the flexible material that forms the sleeve perimeter may be short segments of the bag material. More specifically, sleeve 102 may be formed of net 120, which a user configures to have the desired diameter and length. The interior of net 120 may be configured to be removably coupled to flexible material that forms the perimeter of the sleeve. The flexible material forming the sleeve perimeter may be selected from any suitable materials, such as those discussed above. In some embodiments, the flexible material may be a segment of bag material having the length of the tunnel. In many agricultural bagging operations, lengths of bag material are leftover when a bag has been completed. These lengths of bag are then unusable and wasted. In some embodiments, these leftover segments of bag material can be coupled to the shaping assembly to provide the perimeter of sleeve 102.

It is believed that the disclosure set forth above encompasses multiple distinct methods and/or apparatus with independent utility. While each of these methods and apparatus has been disclosed in its preferred form, the specific examples thereof as disclosed and illustrated herein are not to be considered in a limiting sense as numerous variations are possible. The subject matter of the disclosures includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that correspond to disclosed examples and are novel and non-obvious. Other combinations and subcombinations of features, functions, elements and/or properties may be claimed through amendment of the present claims or presentation of new claims in this or a related application. Such amended or new claims, whether they are directed to different combinations or directed to the same combinations, whether different, broader, narrower or equal in scope to the original claims, are also regarded as included within the subject matter of the present disclosure.

I claim:

1. A bagging machine for packing material into bags, the bagging machine comprising:
    a mobile frame having forward and rearward ends;
    a material packing assembly coupled to the mobile frame and adapted to move the material to the rearward end of the mobile frame;
    a first flexible sleeve having a forward end and a rearward end and a perimeter defined by a flexible material, wherein the forward end of the flexible sleeve is adapted to be operatively coupled to the rearward end of the mobile frame and adapted to receive material from the material packing assembly; and
    a shaping assembly adapted to maintain the first flexible sleeve in a predetermined configuration when the bagging machine is in use; wherein the shaping assembly is adapted to be user-adjustable to selectively shape the first flexible sleeve into at least two substantially cylindrical configurations having different cross-sectional areas ranging from as small as approximately four feet in diameter to as large as approximately twenty feet in diameter; and wherein each of the at least two substantially cylindrical configurations has a substantially uniform cross-sectional areas from the forward end to the rearward end.

2. The bagging machine of claim 1 wherein a grader edge is provided at least proximate the rearward end of the first flexible sleeve.

3. The bagging machine of claim 2 wherein the grader edge includes a flexible cable.

4. The bagging machine of claim 1, wherein the shaping assembly includes one or more straps operatively associated with the perimeter of the first flexible sleeve.

5. The bagging machine of claim 1 wherein the shaping assembly includes a net.

6. The bagging machine of claim 1 wherein the at least two substantially cylindrical configurations of the first flexible sleeve have diameters ranging from as small as approximately 8 feet to as large as approximately 16 feet.

7. The bagging machine of claim 6 wherein the at least two substantially cylindrical configurations of the first flexible sleeve have diameters ranging from as small as approximately 10 feet to as large as approximately 14 feet.

8. The bagging machine of claim 1 wherein the first flexible sleeve is collapsible.

9. The bagging machine of claim 1 wherein the first flexible sleeve has an upper portion and a lower portion, and wherein the lower portion includes a drag member.

10. The bagging machine of claim 1 wherein the first flexible sleeve has a predetermined total length and an adjustable operational length.

11. The bagging machine of claim 10 further comprising a length adjusting system whereby the operational length of the first flexible sleeve may be adjusted.

12. A bagging machine for packing material into bags, the bagging machine comprising:
a mobile frame having forward and rearward ends;
a material packing assembly coupled to the mobile frame and adapted to move the material to the rearward end of the mobile frame;
a first flexible sleeve having a forward end and a rearward end and a perimeter defined by a flexible material, wherein the forward end of the flexible sleeve is adapted to be operatively coupled to the rearward end of the mobile frame and adapted to receive material from the material packing assembly, and wherein the first flexible sleeve is adapted to define a substantially cylindrical passageway having a diameter when the bagging machine is in use; and
at least one additional flexible sleeve having a forward end and a rearward end and a perimeter defined by a flexible material, wherein the forward end of the additional flexible sleeve is adapted to be selectively and operatively coupled adjacent the rearward end of the mobile frame and adapted to receive material from the material packing assembly, and wherein the at least one additional flexible sleeve has a diameter different from the diameter of the first flexible sleeve.

13. A tunnel for use with a bagging machine, the tunnel comprising:
a flexible sleeve having a forward end adapted to be coupled to the bagging machine and having a rearward end, wherein the flexible sleeve defines a passageway; and
a shaping assembly adapted to extend around the perimeter of the flexible sleeve to define the shape of the passageway; wherein the shaping assembly is adapted to be user-adjustable to selectively shape the passageway into at least two substantially cylindrical configurations having different cross-sectional areas ranging from as small as approximately four feet in diameter to as large as approximately twenty feet in diameter; and wherein each of the at least two substantially cylindrical configurations has a substantially uniform cross-sectional area from the forward end to the rearward end.

14. The tunnel of claim 13 wherein a grader edge is provided at least proximate the rearward end of the flexible sleeve.

15. The tunnel of claim 14 wherein the grader edge includes a flexible cable.

16. The tunnel of claim 13 wherein the shaping assembly includes one or more straps.

17. The tunnel of claim 13 wherein the shaping assembly is adapted to shape the passageway in at least two substantially cylindrical configurations having diameters ranging from as small as approximately eight feet to as large as approximately sixteen feet.

18. The tunnel of claim 17 wherein the shaping assembly is adapted to shape the passageway in at least two substantially cylindrical configurations having diameters ranging from as small as approximately ten feet to as large as approximately fourteen feet.

19. The tunnel of claim 13 wherein the shaping assembly further comprises a folding assembly to selectively store portions of the flexible sleeve when the bagging machine is in use.

20. The tunnel of claim 13 wherein the flexible sleeve is collapsible.

21. The tunnel of claim 13 wherein the flexible sleeve has an upper portion and a lower portion, and wherein the lower portion includes a drag-resistance member.

22. The tunnel of claim 13 wherein the flexible sleeve has a predetermined total length and an adjustable operational length.

23. The tunnel of claim 22 further comprising a length adjusting system whereby the operational length of the sleeve may be adjusted.

24. The tunnel of claim 13 wherein flexible sleeve has opposing side edges and wherein the shaping assembly is adapted to configure the flexible sleeve to have in a substantially circular cross-section having a variable diameter.

25. The tunnel of claim 24 wherein the shaping assembly is adapted to draw the side edges of the flexible sleeve together to reduce the diameter of the sleeve and to pull the side edges apart to increase the diameter of the sleeve.

26. The tunnel of claim 13 wherein the shaping assembly is adapted to selectively shape the passageway into a plurality of substantially cylindrical configurations having any diameter between a maximum diameter configuration and a minimum diameter configuration.

* * * * *